US009721194B2

(12) United States Patent
Naruse

(10) Patent No.: US 9,721,194 B2
(45) Date of Patent: Aug. 1, 2017

(54) PRINTING DEVICE

(71) Applicant: CASIO COMPUTER CO., LTD., Shibuya-ku, Tokyo (JP)

(72) Inventor: Kenichi Naruse, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/268,515

(22) Filed: Sep. 16, 2016

(65) Prior Publication Data
US 2017/0083799 A1 Mar. 23, 2017

(30) Foreign Application Priority Data

Sep. 18, 2015 (JP) ................. 2015-185643

(51) Int. Cl.
G06K 15/02 (2006.01)
B41J 2/32 (2006.01)
(52) U.S. Cl.
CPC .............. G06K 15/022 (2013.01); B41J 2/32 (2013.01)
(58) Field of Classification Search
CPC ...... B41J 13/0009; B41J 13/00; B41J 15/046; B41J 15/044; B41J 15/04; B41J 15/00; B41J 15/048; B41J 15/16; B41J 11/42; B41J 11/0095; B41J 2/32
See application file for complete search history.

(56) References Cited

U.S. PATENT DOCUMENTS

| 5,917,727 A * | 6/1999 | Richardson .......... B41J 13/0027 271/227 |
| 9,016,964 B2 | 4/2015 | Tomomatsu et al. |
| 2006/0115313 A1* | 6/2006 | Shaw, III ................. B41J 15/04 400/621 |
| 2012/0082500 A1* | 4/2012 | Noguchi .................. B41J 15/04 400/582 |

FOREIGN PATENT DOCUMENTS

| JP | 2002169645 A | 6/2002 |
| JP | 2006079221 A | 3/2006 |
| JP | 2009223839 A | 10/2009 |
| JP | 2014054795 A | 3/2014 |
| JP | 5477308 B2 | 4/2014 |

* cited by examiner

Primary Examiner — Kristal Feggins
(74) Attorney, Agent, or Firm — Holtz, Holtz & Volek PC

(57) ABSTRACT

There is provided an input device which accepts input with a simple operation. A printing device 100 is an input device which accepts the input of input data, including a motion detection section 100a, a determination section, and an acquisition section 100d. The motion detection section 100a detects the motion of the input device. The determination section determines whether an input condition is met. When the determination section determines that the input condition is met, the acquisition section 100d acquires a trajectory of the input device based on the motion of the input device detected by the motion detection section 100a to acquire, as input data, the layout of a pattern corresponding to the trajectory.

18 Claims, 12 Drawing Sheets

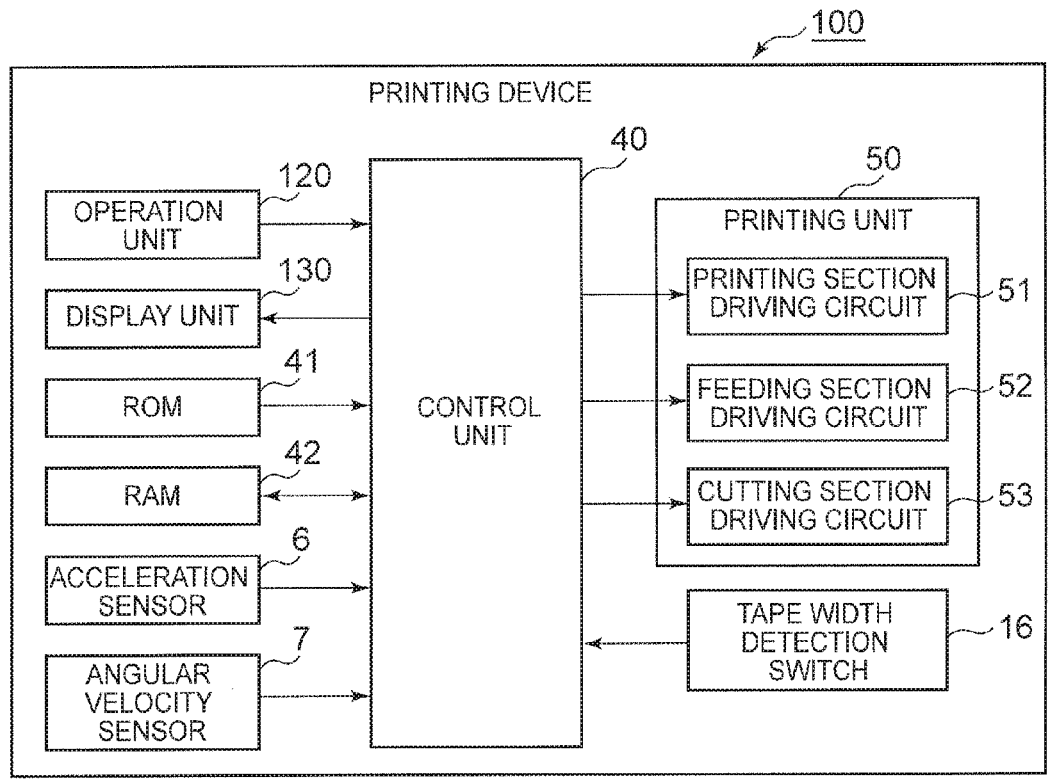
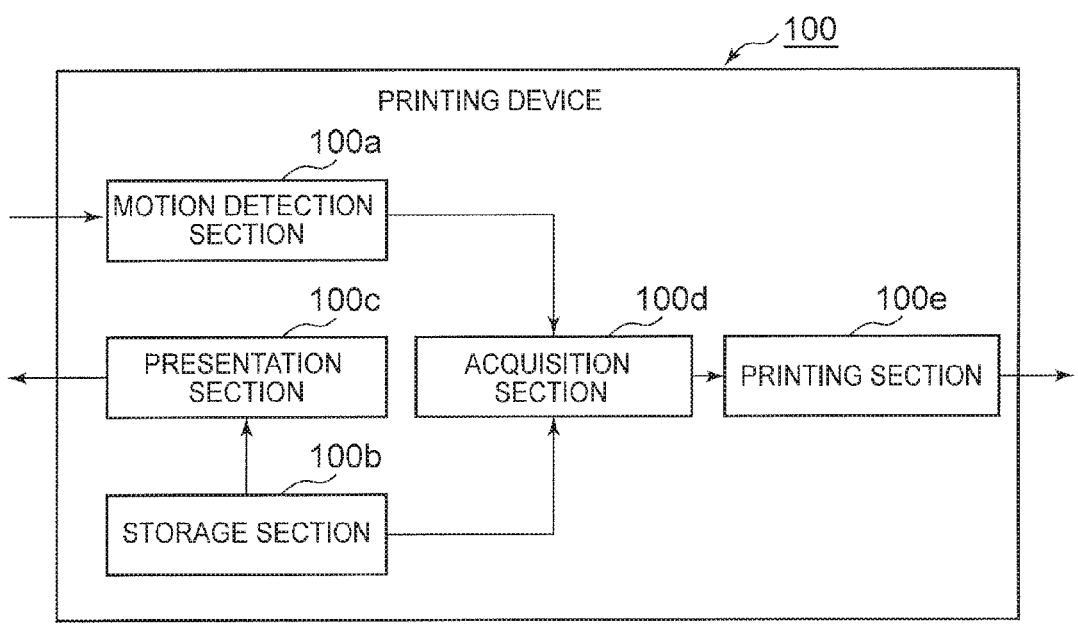

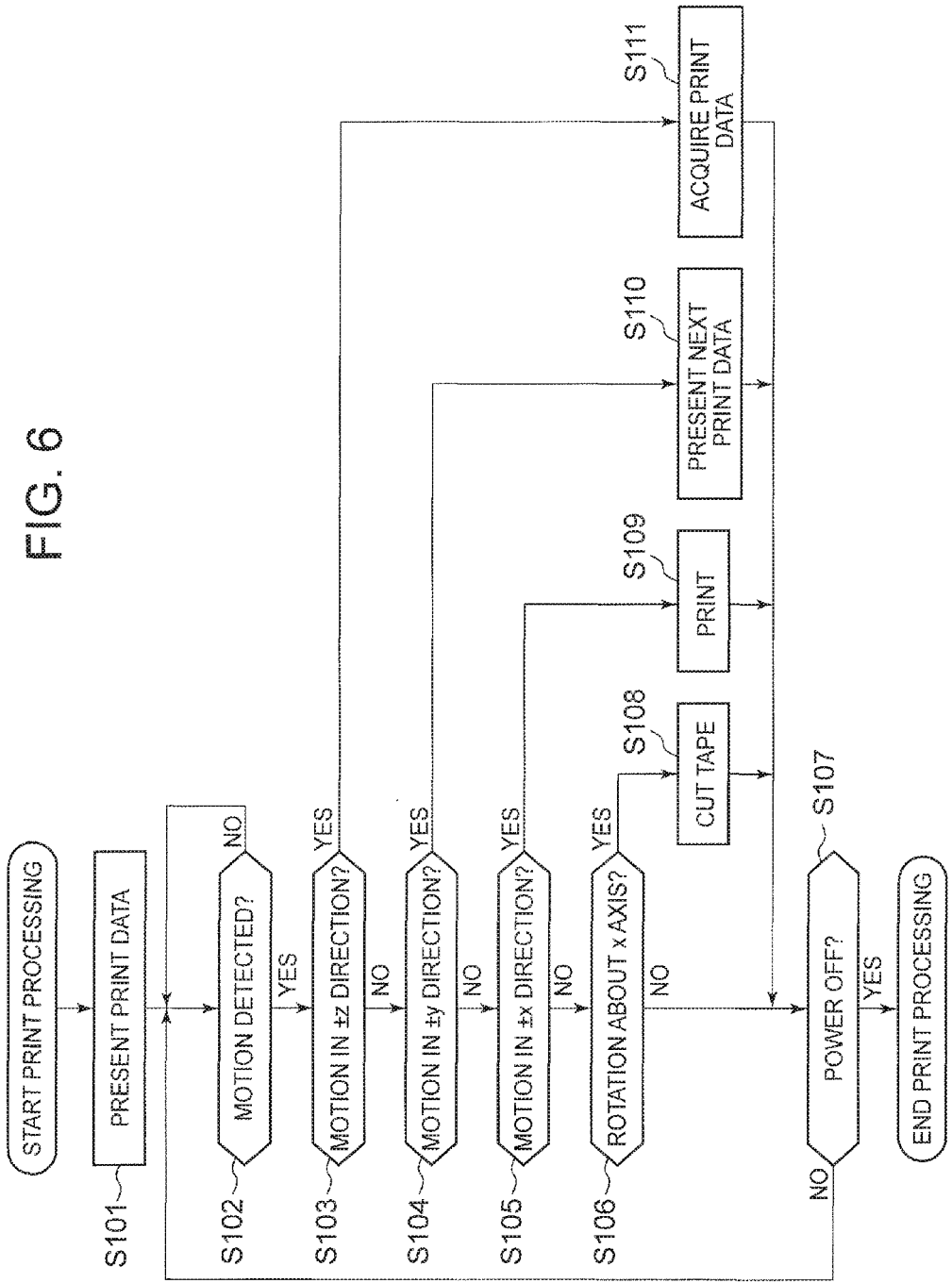

PRINTING DEVICE

CROSS-REFERENCE TO RELATED APPLICATIONS

This application is based upon and claims the benefit of priority from the prior Japanese Patent Application No. 2015-185643, filed Sep. 18, 2015, the entire contents of which are incorporated herein by reference.

BACKGROUND OF THE INVENTION

1. Field of the Invention

The present invention relates to an printing device(input device).

2. Description of the Related Art

An input device which accepts input according to a user operation is known.

Japanese Patent No. 5477308 (Patent Document 1) discloses an input device (tape printing device) which accepts input according to key pressing operations by a user.

The input device disclosed in Patent Document 1 requires complicated operations such as fine key pressing operations using a fingertip to perform input. Therefore, when a user is working with globes in a factory, at a construction site, or the like, it is difficult for the user to perform input using the input device in Patent Document 1 in a situation difficult to carry out the complicated operations.

The present invention has been made to solve the above problem, and it is an object thereof to provide an input device (printing device) which accepts input with a simple operation, and an input method therefore.

SUMMARY OF THE INVENTION

In order to solve the above problem, an input device (printing device) of the present invention includes: a motion detection sensor which detects at least one motion of the printing device to move in a three-dimensional space; a control unit which acquires, from a memory storing plural motions detectable by the motion detection sensor and plural control commands in association with each other, at least one of the control commands based on at least one motion detected by the motion detection sensor among the plural motions; and a printing unit which prints based on at least the one of the control commands acquired by the control unit.

According to the present invention, there can be provided an input device (printing device)which accepts input with a simple operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram illustrating an electrical configuration example of the printing device according to the first embodiment of the present invention.

FIG. 4 is a block diagram illustrating a functional configuration example of the printing device according to the first embodiment of the present invention.

FIG. 5A is a diagram for describing motion in ±x directions, FIG. 5B is a diagram for describing motion in ±y directions, FIG. 5C is a diagram for describing motion in ±z directions, and FIG. 5D is a diagram for describing rotation to the left in the x-axis direction.

FIG. 6 is a flowchart for describing print processing performed by the printing device according to the first embodiment of the present invention.

FIG. 10A is a diagram for describing an operation to present each row of the Gojūon (Japanese ordering of Hiragana, i.e., Japanese alphabetical order) in ascending order. FIG. 10B is a diagram for describing an operation to present each row of the Gojūon in descending order. FIG. 10C is a diagram for describing an operation to select a row presented among the rows of the Gojūon. FIG. 10D is a diagram for describing an operation to select a column of the Gojūon. FIG. 10E is a diagram for describing another operation to present each row of the Gojūon in ascending order. FIG. 10F is a diagram for describing another operation to present each row of the Gojūon in descending order. FIG. 10G is a diagram for describing another operation to select a row presented among the rows of the Gojūon. FIG. 10H is a diagram for describing another operation to select a column of the Gojūon.

FIG. 11A is a diagram illustrating motion of the printing device to move to draw a straight line obliquely upward with respect to the horizontal direction as a direction perpendicular to the vertical direction G inside an xy plane of the printing device (i.e., in a synthetic direction of the horizontal direction and the vertical direction) while keeping the +y direction of the printing device in the same direction as a vertically upward direction as a direction opposite to the vertical direction G, FIG. 11H is a diagram illustrating a layout a. FIG. 11B is a diagram illustrating motion of the printing device to move to draw the straight line obliquely upward with respect to the horizontal direction while keeping the tilt of the printing device constant. FIG. 11I is a diagram illustrating a layout b. FIG. 11C is a diagram illustrating motion of the printing device to move to draw a straight line obliquely downward with respect to the horizontal direction (i.e., in a synthetic direction of the horizontal direction and the vertical direction G) while keeping the +y direction of the printing device in the same direction as a vertically upward direction. FIG. 11J is a diagram illustrating a layout c. FIG. 11D is a diagram illustrating motion of the printing device to draw the straight line obliquely downward with respect to the horizontal direction while keeping the tilt of the printing device constant (where the tilt is an angle between the +y direction of the printing device and the vertically upward direction). FIG. 11K is a diagram illustrating a layout d. FIG. 11E is a diagram illustrating motion of the printing device to move to draw a convex arc vertically upward while keeping the +y direction of the printing device 100 in the same direction as the vertically upward direction. FIG. 11L is a diagram illustrating a layout e. FIG. 11F is a diagram illustrating motion of the printing device to move to draw the convex arc vertically upward while rotating to the left in the z axis direction. FIG. 11M is a diagram illustrating a layout f. FIG. 11G is a diagram illustrating motion of the printing device to move to draw the convex arc vertically upward while the tilt of the printing device constant. FIG. 11N is a diagram illustrating a layout g.

FIG. 12A is a diagram illustrating motion of the printing device to move to draw a convex arc in the vertical direction G while keeping the +y direction of the printing device in the same direction as the vertically upward direction. FIG. 12H is a diagram illustrating a layout h. FIG. 12B is a diagram illustrating motion of the printing device to move to draw the convex arc in the vertical direction G while rotating to the right in the z axis direction. FIG. 12I is a diagram illustrating a layout i. FIG. 12C is a diagram illustrating motion of the printing device to move to draw the convex arc in the vertical direction G while keeping the tilt of the printing device constant. FIG. 12J is a diagram illustrating a layout j. FIG. 12D is a diagram illustrating motion of the printing device to move in the +z direction while keeping the +y direction of the printing device in the same direction as the vertically upward direction. FIG. 12K is a diagram illustrating a layout k. FIG. 12E is a diagram illustrating motion of the printing device to move in the −z direction while keeping the +y direction of the printing device in the same direction as the vertically upward direction. FIG. 12L is a diagram illustrating a layout l. FIG. 12F is a diagram illustrating motion of the printing device to first move in the +z direction while keeping the +y direction of the printing device 100 in the same direction as the vertically upward direction and then move in the −z direction. FIG. 12M is a diagram illustrating a layout m. FIG. 12G is a diagram illustrating motion of the printing device to first move in the −z direction while keeping the +y direction of the printing device 100 in the same direction as the vertically upward direction and then move in the +z direction. FIG. 12N is a diagram illustrating a layout n.

DETAILED DESCRIPTION OF THE INVENTION

First Embodiment

Figure 1B:
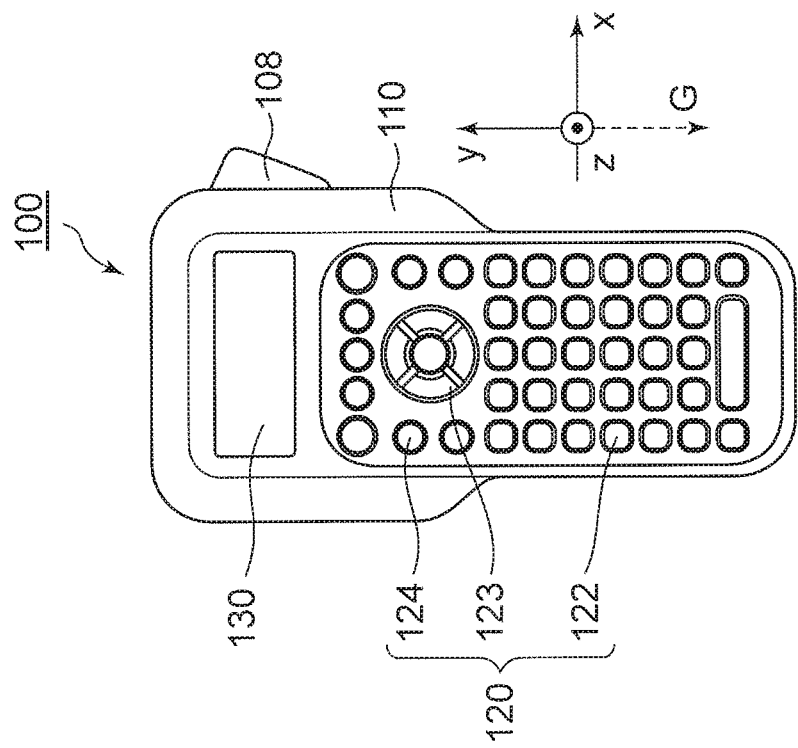
FIG. 1B is a plan view of the printing device according to the first embodiment of the present invention.

A first embodiment of the present invention will be described below with reference to the drawings. Note that the same or equivalent parts are given the same reference numerals in the drawings. In the embodiment, description will be made by taking a printing device (label printer) as an example of an input device (printing device) according to the present invention.

Figure 1A:
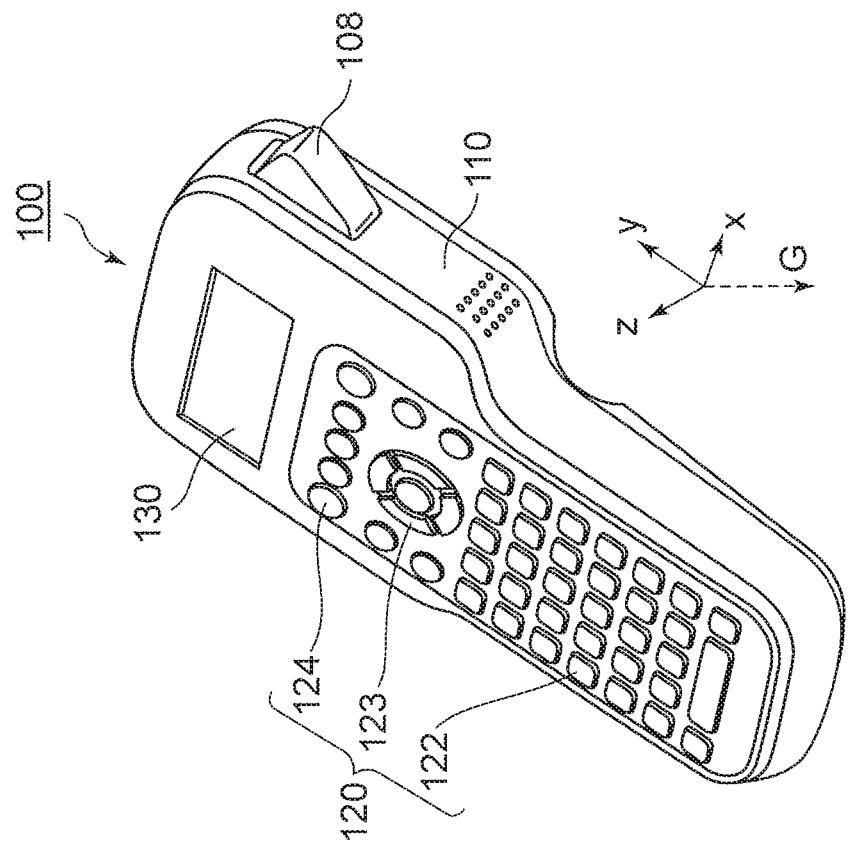
FIG. 1A is a perspective view of the external appearance of a printing device according to a first embodiment of the present invention.

A printing device 100 illustrated in FIGS. 1A and 1B is a label printer used to print, on a tape medium, an image based on print data (constituent elements (pattern) composed of pictograms, characters, and the like). The tape medium is a recording medium (printing medium) formed by laminating a printing tape, in which the surface is the printing surface and the reverse side is an adhesive surface, and a peel-off tape attached to the adhesive surface.

The printing device 100 is a compact label printer, which is of a size enough to be held by one hand of a user and moved freely. When the user holds and moves the main body of the printing device 100 in a three-dimensional space, the printing device 100 accepts the input of input data based on this motion. The input data is data desired by the user to input, including print data and control commands. Hereinafter, a coordinate system illustrated in FIGS. 1A and 1B is set to describe the motion of the printing device 100. As illustrated in FIGS. 1A and 1B, the x axis in this coordinate system is set to a width direction as the short-side direction of the printing device 100, the y axis is set to a height direction as the long-side direction of the printing device 100, and the z axis is set to a thickness direction of the printing device 100 in parallel with one another. Note that G in the drawings denotes a directional vector (vertical direction) of the acceleration of gravity.

A mechanical configuration of the printing device 100 will be described below.

As illustrated in FIGS. 1A and 1B, the printing device 100 includes a housing 110. The housing 110 stores therein a thermal head, a printed circuit board, and the like, to be described later. A cutter operating lever 108 is provided on a side face of the housing 110 to cut a tape medium (recording medium) after an image based on print data is printed out.

An operation unit 120 and a display unit 130 are provided on the top face of the housing 110. The operation unit 120 includes multiple rubber-made pressing keys 122, 123, and 124 functioning as operation keys. The display unit 130 includes a display screen such as a liquid crystal display panel as a main panel on the printing device 100. For example, the display unit 130 displays an image related to input data, selection menus for various settings, messages related to various processes, and the like. The operation unit 120 functions as operation means.

Figure 2A:
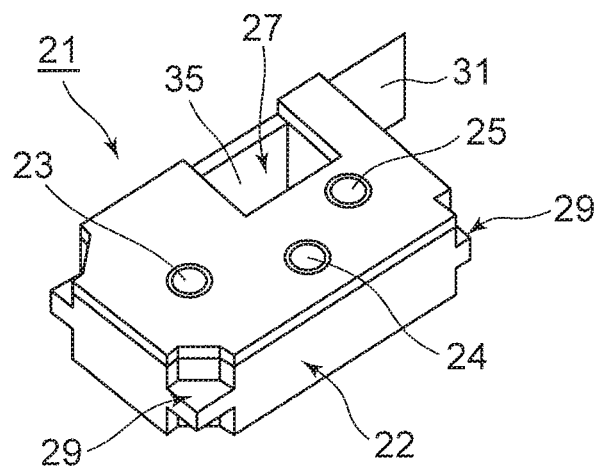
FIG. 2A is a perspective view of the external appearance of a tape cassette.
Figure 2B:
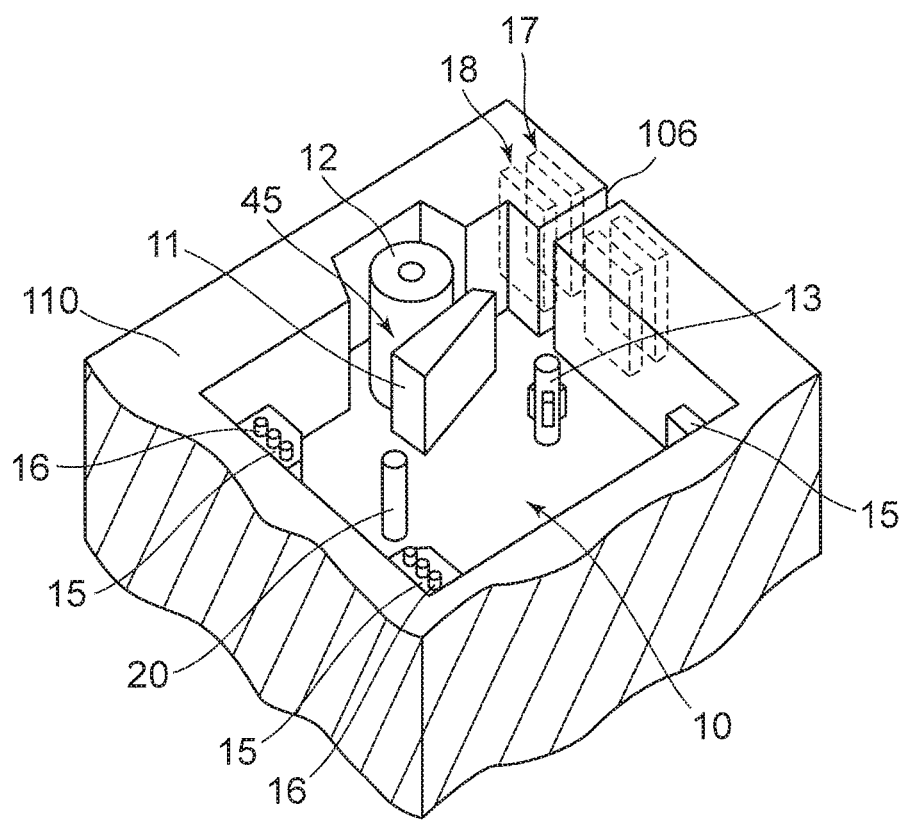
FIG. 2B is an internal enlarged view of the printing device according to the first embodiment of the present invention.

As illustrated in FIG. 2B, a tape storage part 10 is formed inside the housing 110 to store (load) a tape cassette with a tape medium and an ink ribbon stored therein. Inside the tape storage part 10, a tape printing mechanism 45 as a printing unit and cassette receiving portions 15 retaining a tape cassette 21 in a predetermined position are formed.

The tape printing mechanism 45 includes a print head (thermal head) 11, a platen roller 12 which feeds the tape medium and the ink ribbon while sandwiching them with the print head 11, an alignment spool 20 engaged with the tape cassette to locate the tape cassette, and a ribbon reeling spool 13 which reels, into the tape cassette, the ink ribbon after used for printing.

A tape unreeling portion 106 is formed in one end portion of the tape storage part 10 to communicate with a side face of the housing 110 to unreel the tape medium after the printing. A full-cut mechanism 17, which cuts a printed tape and a peel-off tape of the tape medium in the width direction, and a half-cut mechanism 18, which cuts only the printed tape of the tape medium without cutting the peel-off tape, are incorporated in the tape unreeling portion 106.

As illustrated in FIG. 2A, the tape cassette 21 includes a cassette case 22. A tape core spool 23 about which a tape medium 31 is wound, a ribbon supplying core spool 24 about which an unused ink ribbon 35 is wound, and a ribbon reeling core spool 25 about which a used ink ribbon 35 is wound are housed inside the cassette case 22, respectively. Further, a head placing part 27 in which the print head 11 is located when the tape cassette 21 is loaded into the tape storage part 10 is formed in the cassette case 22 of the tape cassette 21.

Engaging portions 29 engaged with and supported by the cassette receiving portions 15 of the tape storage part 10 are formed in corners of the cassette case 22. Predetermined unevenness (not illustrated) corresponding to the width of the tape medium 31 incorporated in the tape cassette 21 is formed in the engaging portions 29 of the cassette case 22. A tape width detection switch 16 is formed in each of the cassette receiving portions 15 of the tape storage part 10.

When the cassette case 22 is loaded in the tape storage part 10, the engaging portions 29 of the cassette case 22 and the cassette receiving portions 15 of the tape storage part 10 are so engaged that at least part of the tape width detection switch 16 will be pressed down by the unevenness of the engaging portions 29 and hence turned on. The printing device 100 acquires a combination of on and off states of the tape width detection switch 16 to acquire a width of the tape medium 31 incorporated in the tape cassette 21. The printing device 100 creates print data adapted to the acquired width of the tape medium 31.

When printing is instructed, the tape medium 31 is unreeled from the tape cassette 21 and the ink ribbon 35 is wound up. The tape medium 31 and the ink ribbon 35 are fed in an overlapped state while being sandwiched between the platen roller 12 and the print head 11.

Then, the print head 11 is driven based on print data to generate heat so that ink of the ink ribbon 35 will be thermally transferred to the printing tape of the tape medium 31 to do a print. When printing is completed, a user operates the cutter operating lever 108 to actuate the full-cut mechanism 17 or the half-cut mechanism 18 so that the tape medium 31 will be cut in the width direction to create one tape label.

As illustrated in FIG. 3, the printing device 100 having the above mechanical configuration includes, in terms of electronics, a control unit 40, an operation unit 120, a display unit 130, a ROM (Read Only Memory) 41, a RAM (Random Access Memory) 42, an acceleration sensor 6, an angular velocity sensor 7, a printing unit 50, and the tape width detection switch 16. Note that the input device (printing device 100) may be equipped with the printing unit 50 separately from the main body of the input device to which input data are input. Further, the input device (printing device 100) may be equipped with the control unit 40 separately from the main body of the input device to which input data are input.

The control unit 40 includes a CPU (Central Processing Unit) which executes various programs prestored in the ROM 41, such as an input program for accepting input according to a user operation and a control program for controlling the entire printing device 100, to control each unit of the printing device 100. The details of control performed by the control unit 40 will be described later.

The ROM 41 fixedly stores programs and data. Specifically, the ROM 41 holds prestored various programs including the input program and the control program. The ROM 41 also stores data including plural pieces of print data. Each of the plural pieces of print data stored in the ROM 41 contains constituent elements, such as pictograms and characters, stored in order with respect to one another.

The RAM 42 temporarily stores data and programs. The RAM 42 functions as a work memory when the control unit 40 executes a program(s).

The acceleration sensor 6 detects the acceleration of the printing device 100.

The angular velocity sensor 7 detects the angular velocity of the printing device 100.

The printing unit 50 includes a printing section driving circuit 51, a feeding section driving circuit 52, and a cutting section driving circuit 53. The printing section driving circuit 51 controls the print head 11 as the printing unit based on the print data to do a print on the tape medium 31. The feeding section driving circuit 52 is a circuit for driving a feeding section to control a feed motor such as a step motor to rotate the platen roller 12 or the ribbon reeling spool 13 so as to feed the tape medium 31 in the long-side direction at a predetermined speed. The cutting section driving circuit 53 is a driving circuit for controlling a cutting section (cutting unit) to control a stepping motor used in the full-cut mechanism 17 and a DC motor used in the half-cut mechanism 18 under the control of the control unit 40.

Further, the control unit 40 is connected to the tape width detection switch 16 to acquire the width of the tape medium 31 based on the combination of on and off states of the tape width detection switch 16.

As illustrated in FIG. 4, the printing device 100 having the above mechanical and electrical configurations functionally includes a motion detection section 100a, a storage section 100b, a presentation section (display unit) 100c, an acquisition section 100d, and a printing section 100e. Note that the storage section (memory) 100b does not always have to be provided in the main body of the printing device 100, and it may be provided in a virtual server (cloud).

Figure 5A:
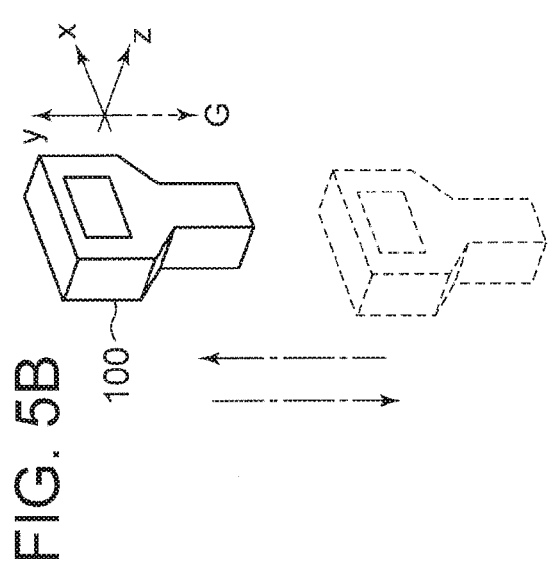
FIG. 5A to FIG. 5D are diagrams for describing the motion of the printing device according to the first embodiment of the present invention, where
Figure 5B:
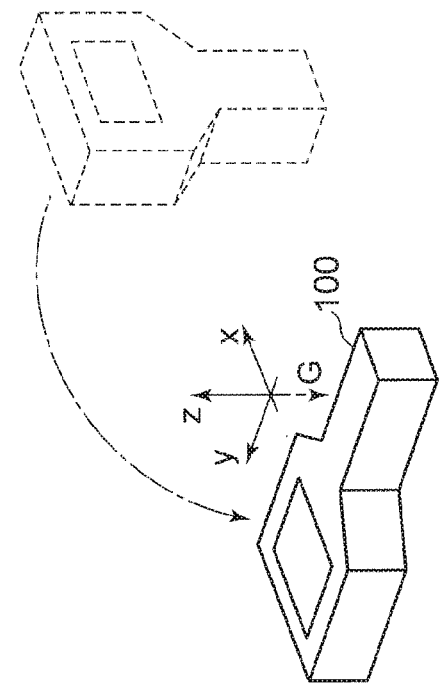
Figure 5C:
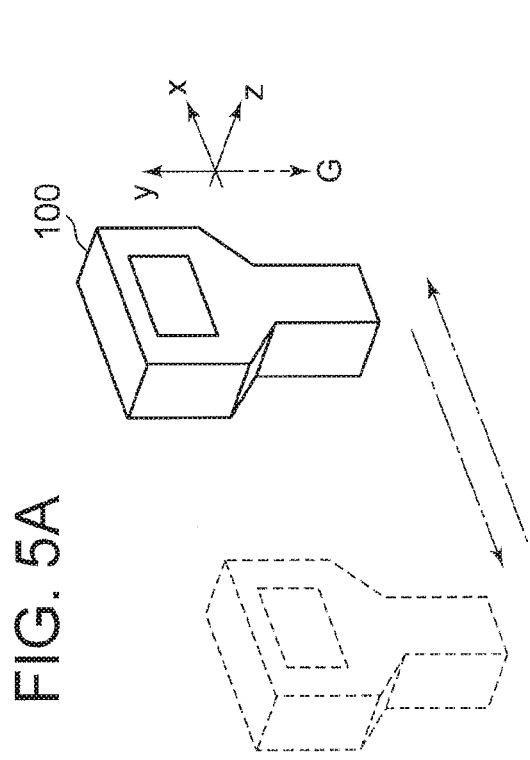
Figure 5D:
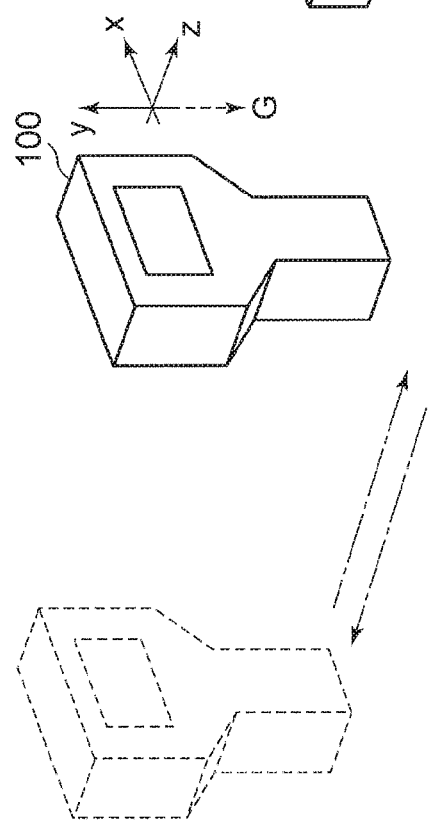

The motion detection section 100a detects at least part of motion of the printing device 100 in a three-dimensional space. For example, the motion detection section 100a detects the motion of the printing device 100 illustrated in FIG. 5A to FIG. 5D. FIG. 5A illustrates the motion of the printing device 100 to move alternately in a +x direction and a −x direction (motion in the ±x directions). FIG. 5B illustrates the motion of the printing device 100 to move alternately in a +y direction and a −y direction (motion in the ±y directions). FIG. 5C illustrates the motion of the printing device 100 to move alternately in a +z direction and a −z direction (motion in the ±z directions). FIG. 5D illustrates the motion of the body of the printing device 100 to rotate to the left in the x-axis direction. The motion detection section (motion detection sensor) 100a is realized by the acceleration sensor 6, the angular velocity sensor 7, and the control unit 40 in cooperation with one another. The motion detection section 100a functions as motion detection means.

The storage section 100b is realized by the ROM 41 to store multiple candidates for input data. Specifically, the storage section 100b stores plural pieces of print data in order with respect to one another as input data candidates. Further, the storage section 100b stores, as input data candidates, plural control commands in association with plural motions (motion patterns) of the printing device 100 detectable by the motion detection section 100a. The storage section 100b functions as storage means.

More specifically, the storage section 100b stores a "printing" command in association with motion in the ±x directions illustrated in FIG. 5A. The "printing" command is a control command to cause the printing unit 50 to print out print data on the tape medium 31.

Further, the storage section 100b stores a "next option" command in association with motion (first motion) in the ±y directions illustrated in FIG. 5B. The "next option" command is a control command to cause the presentation section 100c to present next print data.

Further, the storage section 100b stores an "acquisition" command in association with motion (second motion) in the ±z directions illustrated in FIG. 5C. The "acquisition" command is a control command to cause the acquisition section 100d to be described later to acquire, as input data, the print data presented by the presentation section 100c.

Further, the storage section 100b stores a "tape cut" command in association with rotation to the left in the x-axis direction illustrated in FIG. 5D. The "tape cut" command is a control command to cause the full-cut mechanism 17 or the half-cut mechanism 18 to cut the tape medium 31.

The presentation section (display unit) 100c presents (displays), to a user, any one of images based on plural pieces of print data stored in the storage section 100b. In the embodiment, the presentation section 100c is realized by the display unit 130 and the control unit 40 in cooperation with each other to display the image representing the print data. The presentation section 100c functions as presentation means.

The acquisition section 100d is realized by the control unit 40 to acquire input data including print data and a control command based on the motion of the printing device 100 detected by the motion detection section 100a. Specifically, the acquisition section 100d acquires, as input data, a control command stored in the storage section 100b in association with the motion of the printing device 100 detected by the motion detection section 100a. The acquisition section 100d functions as acquisition means.

More specifically, when the motion detection section 100a detects motion in the ±x directions, the acquisition section 100d acquires the "printing" command as input data.

When the motion detection section 100a detects motion in the ±y directions, the acquisition section 100d acquires the "next option" command as input data.

When the motion detection section 100a detects motion in the ±z directions, the acquisition section 100d acquires the "acquisition" command as input data. Further, in response to acquiring the "acquisition" command, the acquisition section 100d acquires, as input data, print data presented by the presentation section 100c.

Further, when the motion detection section 100a detects rotation to the left in the x-axis direction, the acquisition section 100d acquires the "tape cut" command as input data.

The printing section 100e prints out, on the tape medium 31, print data acquired as input data by the acquisition section 100d. The printing section 100e is realized by the printing unit 50. The printing section 100e functions as printing means.

The details of print processing performed by the printing device 100 having the above physical and functional configurations will be described below with reference to a flowchart in FIG. 6.

The storage section 100b of the printing device 100 acquires in advance from the outside and prestores control commands and print data as input data candidates.

When a user desired to print out print data on the tape medium 31 turns on the printing device 100, the printing device 100 starts print processing illustrated in the flowchart of FIG. 6.

When the print processing is started, the presentation section 100c first presents any one of plural pieces of print data stored in the storage section 100b (step S101). Next, the motion detection section 100a determines whether any motion of the printing device 100 is detected (step S102). When it is determined that no motion is detected (NO in step S102), the processing in step S102 is repeated until any motion is detected.

When it is determined that any motion is detected (YES in step S102), the motion detection section 100a determines whether motion in the ±z directions illustrated in FIG. 5C is detected (step S103). When the presentation section 100c is presented desired print data, the user moves the printing device 100 in the ±z directions to urge the printing device 100 to acquire the print data. In response to this, the motion detection section 100a determines that the motion in the ±z directions is detected (YES in step S103), and the acquisition section 100d acquires the "acquisition" command. In response to acquiring the "acquisition" command, the acquisition section 100d acquires, as input data, the print data presented at the time by the presentation section 100c (step S111), and the procedure proceeds to step S107.

When it is determined that no motion in the ±z directions is detected (NO in step S103), the motion detection section 100a determines whether motion in the ±y directions illustrated in FIG. 5B is detected (step S104). When the desired print data are not presented by the presentation section 100c, the user moves the printing device 100 in the ±y directions to urge the printing device 100 to present next print data. In response to this, the motion detection section 100a determines that the motion in the ±y directions is detected (YES in step S104), and the acquisition section 100d acquires the "next option" command as input data and supplies it to the presentation section 100c. In response to this, the presentation section 100c presents the next print data (step S110), and the procedure proceeds to step S107.

When it is determined that no motion in the ±y directions is detected (NO in step S104), the motion detection section 100a determines whether the motion in the ±x directions illustrated in FIG. 5A is detected (step S105). When the desired print data are already acquired by the printing device 100, the user moves the printing device 100 in the ±x directions to urge the printing device 100 to print out the print data. In response to this, the motion detection section 100a determines that the motion in the ±x directions is detected (YES in step S105), and the acquisition section 100d acquires the "printing" command as input data and supplies it to the printing section 100e. In response to this, the printing section 100e prints out the print data on the tape medium 31 (step S109), and the procedure proceeds to step S107.

When determining that no motion in the ±x directions is detected (NO in step S105), the motion detection section 100a determines whether rotation to the left in the x-axis direction illustrated in FIG. 5D is detected (step S106). When the desired print data are already printed out on the tape medium 31, the user rotates the printing device 100 to the left in the x-axis direction to urge the printing device 100 to cut the tape medium 31. In response to this, the motion detection section 100a determines that the rotation to the left in the x-axis direction is detected (YES in step S106), and the acquisition section 100d acquires the "tape cut" command as input data and supplies it to the cutting section driving circuit 53. In response to this, the cutting section driving circuit 53 controls the stepping motor used for the full-cut mechanism 17 or the DC motor used for the half-cut mechanism 18 to cut the tape medium 31 (step S108), and the procedure proceeds to step S107.

When determining that no rotation to the left in the x-axis direction is detected (NO in step S106), the motion detection section 100a determines whether the printing device 100 is in the power-off state (step 107). When it is determined that the printing device 100 is not in the power-off state (NO in step S107), the procedure returns to step S102. After completion of desired motion of the printing device 100, the user turns off power to urge the printing device 100 to end the print processing. In response to this, the printing device 100 determines that the power is in the off state (YES in step S107), and the print processing in the flowchart of FIG. 6 is ended.

As described above, when the user moves the printing device 100 according to the embodiment in the three-dimensional space, the printing device 100 accepts the input of print data or a control command based on this motion. In other words, the printing device 100 can accept input with a simple operation.

Note that association between the motion of the printing device 100 and an input data candidate described in the embodiment is just an example, and both can be associated by any other method. For example, the motion of the printing device 100 (for example, motion to draw a predetermined trajectory) and an input data candidate (for example, a control command to stop printing), both of which are not described in the embodiment, may be associated with each other.

Further, in the embodiment, the printing device 100 does not differentiate motion to move in the -direction after moving in the + direction on a coordinate axis and motion to move in the + direction after moving in the - direction, but both may be differentiated to associate them with different input data candidates. For example, while the printing device 100 associates motion to move in the +y direction after moving in the -y direction with a control command to present the next print data, the printing device 100 can associate motion to move in the -y direction after moving in the +y direction with a control command to present the previous print data.

Alternatively, an operation button having a size easy to operate with a gloved fingertip may be provided in the operation unit 120 to associate different input data candidates with the same motion of the printing device 100 depending on whether this operation button is pressed or not. For example, the control command to present the next print data can be associated with the motion in the ±y directions in the state of pressing the operation button, while the control command to present the previous print data can be associated with the motion in the ±y directions in the state of not pressing this operation button.

Second Embodiment

In the above first embodiment, plural pieces of print data are prestored to acquire any piece of print data as input data. However, this is just an example, and the print data can be acquired by any other method. The function and operation of a printing device 100' to acquire a trajectory of its own device as print data will be described below.

Figure 7A:
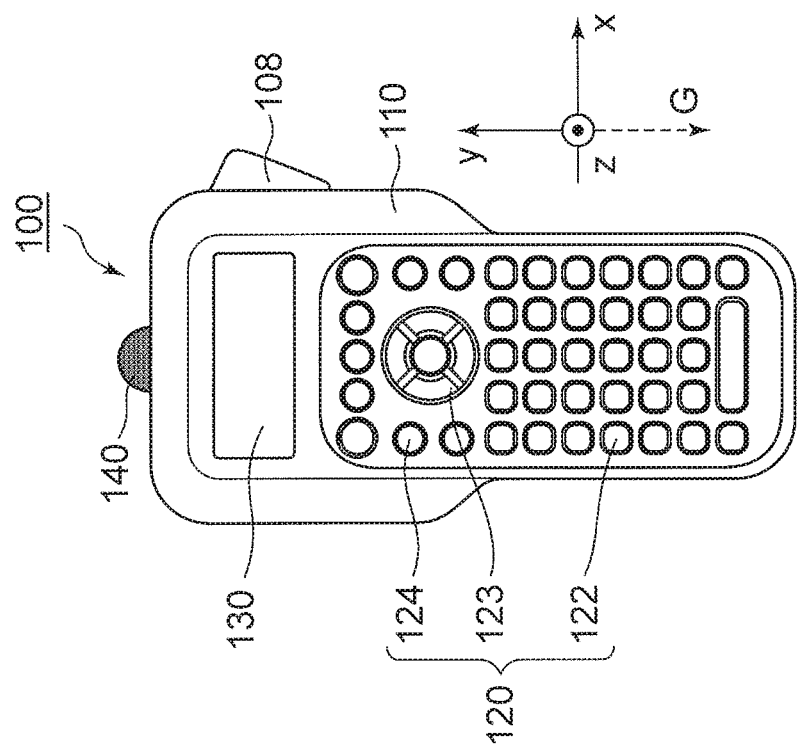
FIG. 7A is a perspective view of the external appearance of a printing device according to a second embodiment of the present invention.
Figure 7B:
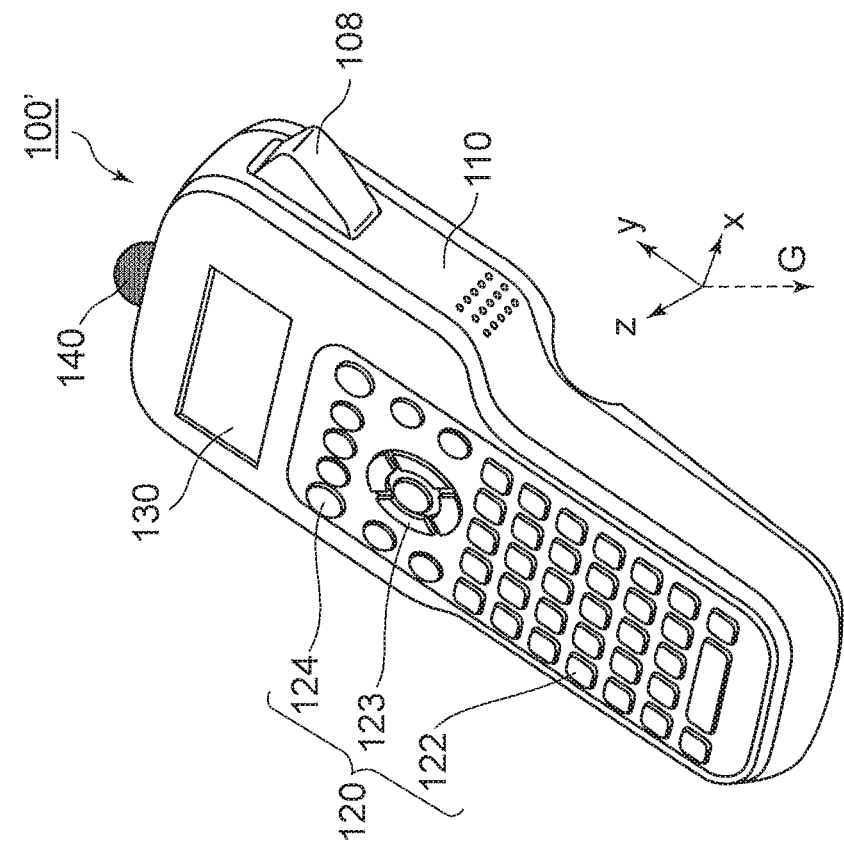
FIG. 7B is a plan view of the printing device according to the second embodiment of the present invention.

The physical and functional configurations of the printing device 100' are substantially the same as the physical and functional configurations of the printing device 100 according to the first embodiment, but part of them is different. Like in the first embodiment, a coordinate system illustrated in FIGS. 7A and 7B is set to describe the motion of the printing device 100'. As illustrated in FIGS. 7A and 7B, the x axis in this coordinate system is set to a width direction as the short-side direction of the printing device 100', the y axis is set to a height direction as the long-side direction of the printing device 100', and the z axis is set to a thickness direction of the printing device 100' in parallel, respectively. Note that G in the figures denotes a directional vector (vertical direction) of the acceleration of gravity.

As illustrated in FIGS. 7A and 7B, the printing device 100' includes a sliding part 140 as a mechanical component. The sliding part 140 is a hemispherical member provided in an edge portion on the longitudinal side of the housing 110. The surface of the sliding part 140 is processed to be smoothly slide on an external object (such as a wall surface, a desktop, or a palm of the user's hand). The sliding part 140 has a pressure sensitive sensor for detecting pressure. The sliding part 140 functions as sliding means.

Figure 8:
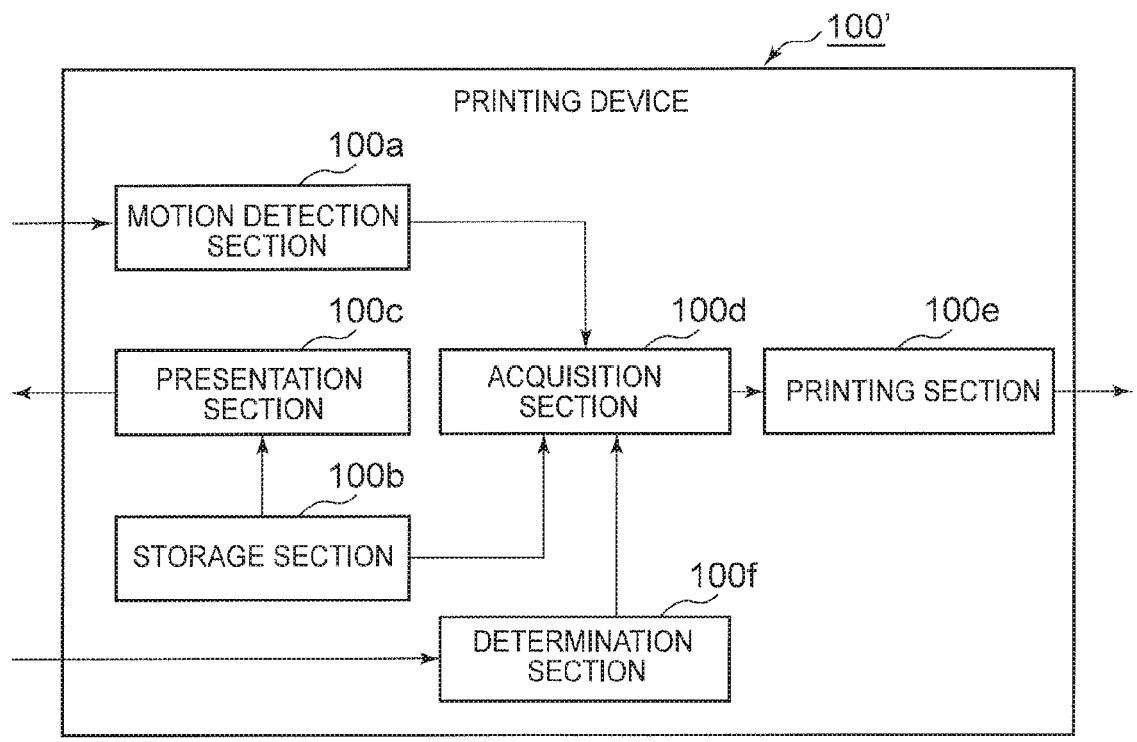
FIG. 8 is a block diagram illustrating a functional configuration example of the printing device according to the second embodiment of the present invention.

As illustrated in FIG. 8, the printing device 100' functionally includes a determination section 100f. The determination section 100f determines whether an input condition is met. In the embodiment, the input condition is that the sliding part 140 is sliding on an external object. The determination section 100f acquires a pressure value detected by the pressure sensitive sensor provided in the sliding part 140 to determine whether the acquired pressure value is equal to or larger than a predetermined threshold in order to determine whether the input condition is met (whether the sliding part 140 is sliding on the eternal object). The determination section 100f is realized by the control unit 40. The determination section 100f functions as determination means.

Based on the motion of the printing device 100' detected by the motion detection section 100a in a state determined by the determination section 100f to meet the input condition, the acquisition section 100d acquires a trajectory of the printing device 100' in the state determined by the determination section 100f to meet the input condition. Specifically, the acquisition section 100d integrates the accelerations of the printing device 100 detected by the acceleration sensor 6 included in the motion detection section 100a to acquire the positions of the printing device 100' in the three-dimensional space. Then, these positions are fitted to an approximate curve (or approximate straight line) to acquire the trajectory of the printing device 100'. The acquisition section 100d acquires, as print data (input data), the trajectory of the printing device 100' thus acquired.

Figure 9:
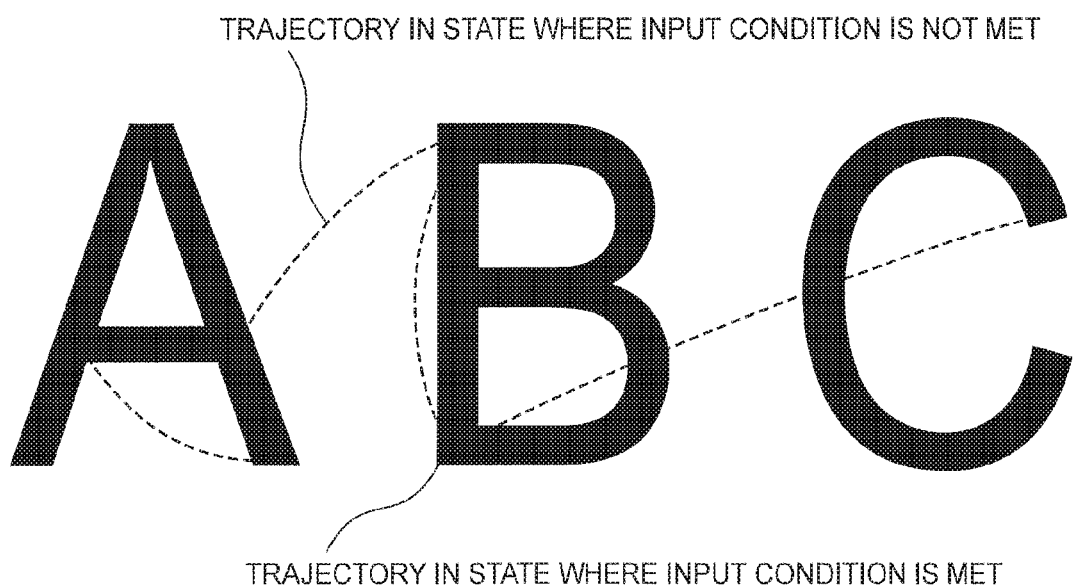
FIG. 9 is a diagram for describing a trajectory of the printing device according to the second embodiment of the present invention.

For example, suppose that the user moves the printing device 100' to draw the trajectory illustrated in FIG. 9. In this case, when drawing trajectories indicated by solid lines in FIG. 9, user slides the sliding part 140 on a wall surface (external object), while when drawing trajectories indicated by broken lines, the user moves the printing device 100' in a manner not to bring the sliding part 140 into contact with the wall surface. In other words, the solid line in FIG. 9 indicates a trajectory of the printing device 100' in a state where the input condition is met (i.e., where the sliding part 140 is slid on the external object), and the broken line indicates a trajectory of the printing device 100' in a state where the input condition is not met. In this case, the acquisition section 100*d* acquires a sequence of trajectories indicated by the solid lines in FIG. 9 based on the motion of the printing device 100' detected by the motion detection section 100*a* to acquire this sequence of trajectories as print data.

As described above, the printing device 100' according to the embodiment accepts the input of print data (input data) based on the motion of the own device. In other words, the input of print data can be accepted with a simple operation without carrying out complicated operations such as fine key pressing operations using a fingertip.

Since the printing device 100' according to the embodiment acquires any trajectory of the own device as print data, input of a variety of print data can be accepted compared with the printing device 100 of the first embodiment which acquires any piece of prestored print data as input data. Further, unlike the printing device 100 according to the first embodiment, since there is no need to prestore plural pieces of print data, the storage capacity can be saved.

In the embodiment, sliding of the sliding part 140 on the external object is described as the input condition, but this is just an example, and the input condition can be set arbitrarily.

For example, an operation button having a size easy to operate with a gloved fingertip may be provided in the operation unit 120 to set, as the input condition, such a condition that this operation button is being pressed. In this case, the user moves the printing device 100' to draw desired print data as a trajectory while pressing this operation button, and the acquisition section 100*d* acquires this trajectory as print data.

A ranging sensor may also be provided to acquire distance between the printing device 100' and the external object in order to set, as the input condition, such a condition that the distance acquired by this ranging sensor is a predetermined value or less. In this case, the user moves the printing device 100' near the external object to draw desired print data as a trajectory, and the acquisition section 100*d* acquires this trajectory as print data.

Such a condition that the motion detection section 100*a* detects predetermined motion (for example, motion to move in the ±z directions continuously twice or motion to rotate about the x axis after moving in the +z direction) may further be set as the input condition. Further, the acquisition of print data may be completed in response to the fact that the motion detection section 100*a* detects the predetermined motion again. In this case, the user moves the printing device 100' to draw a trajectory of desired print data after causing the printing device 100' to perform predetermined motion, and then causes the printing device 100' to perform the predetermined motion again. The acquisition section 100*d* acquires, as print data, the trajectory of the printing device 100' during a period from when the motion detection section 100*a* detects the predetermined motion once until it detects the predetermined motion again.

In the embodiment, the trajectory of the printing device 100' is input as print data, but this is just an example. The print data can also be input by another method based on the motion of the printing device 100'. Hereinafter, a method of inputting print data by inputting character types (Hiragana: a Japanese phonetic characters) as constituent elements of the print data based on a combination of motions of the printing device 100' will be described. It is assumed that the ordering of character types (for example, the ordering of Roman letters corresponding to the ordering of the Gojūon, which is Japanese ordering of Hiragana) is prestored in the storage section 100*b*. Note that the Roman letters are alphabetical letters representing Japanese Hiragana characters in the Gojūon, where two letters of a first letter (consonant) and a second letter (vowel) constitute one character type.

Figure 10A:
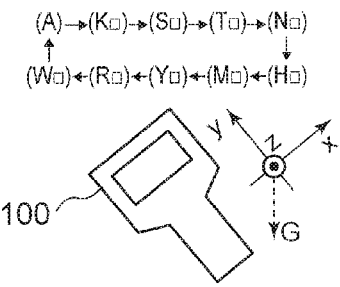
FIG. 10A to FIG. 10H are diagrams for describing another method of inputting print data, where
Figure 10B:
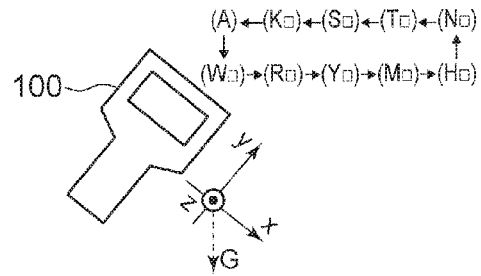
Figure 10C:
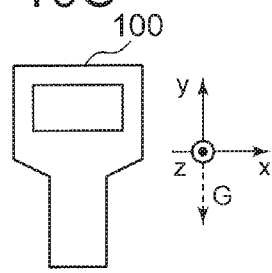
Figure 10D:
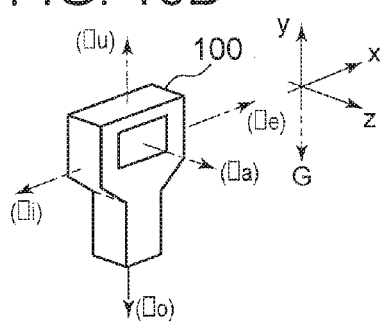

As illustrated in FIG. 10A, when the motion detection section 100*a* detects that the printing device 100' is tilted to the left, the presentation section 100*c* presents each row (each of A row to W☐ row) of the Gojūon every predetermined time (e.g., every five seconds) sequentially in ascending order of the character arrangement. The motion detection section 100*a* detects the acceleration of gravity using the acceleration sensor 6 to detect the tilt of the printing device 100'. As illustrated in FIG. 10B, when the motion detection section 100*a* detects that the printing device 100' is tilted to the right, the presentation section 100*c* presents each row (each of A row to W☐ row) of the Gojūon every predetermined time (e.g., every five seconds) sequentially in descending order of the character arrangement. As illustrated in FIG. 10C, when the motion detection section 100*a* detects that the tilt of the printing device 100' is eliminated, the row of the Gojūon presented at the time is selected. In the state where the row is selected, when the motion detection section 100*a* detects each motion illustrated in FIG. 10D, the acquisition section 100*d* acquires, as input data, a character of the selected row in a column corresponding to the detected motion. Specifically, as illustrated in FIG. 10D, the acquisition section 100*d* acquires, as input data, a character of the "☐a column" in the selected row when the motion detection section 100*a* detects motion in the +z direction, a character of the "☐e column" when the motion detection section 100*a* detects motion in the +x direction, a character of the "☐i column" when the motion detection section 100*a* detects motion in the −x direction, a character of the "☐u column" when motion detection section 100*a* detects motion in the +y direction, and a character in the "☐o column" when the motion detection section 100*a* detects motion in the −y direction, respectively. Thus, characters as the constituent elements of print data are input sequentially based on the motions of the printing device 100' to enable input of the print data. In the above description, characters are used as examples of the constituent elements of the print data, but the constituent elements of the print data may also be pictograms.

Figure 10E:
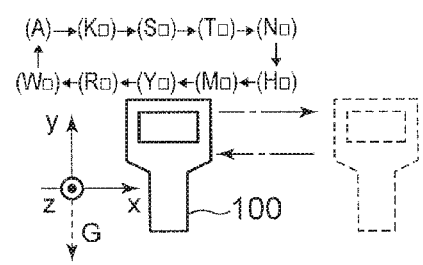
Figure 10F:
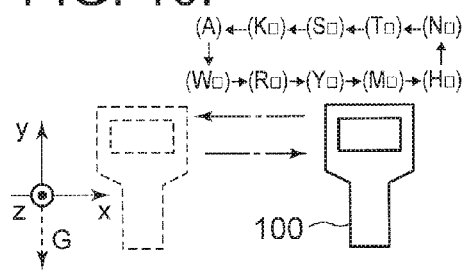
Figure 10G:
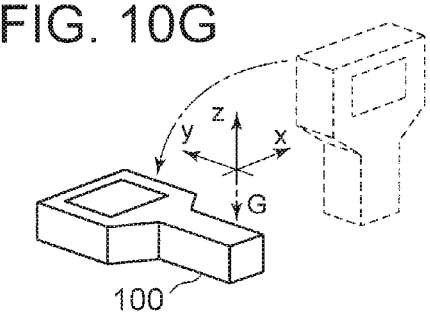
Figure 10H:
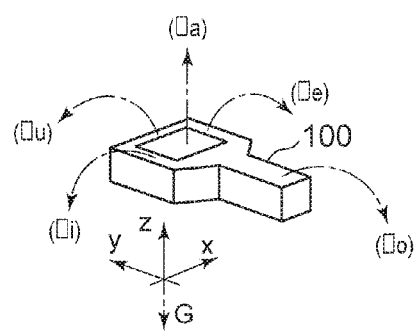

Note that the above input method for the characters (the constituent elements of print data) is just an example, and the characters can also be input by another method. Hereinafter, the other method of inputting the characters will be described. As illustrated in FIG. 10E, each time the motion detection section 100*a* detects the motion of the printing device 100' to move in the −x direction after first moving in the +x direction, the presentation section 100*c* presents each row of the Gojūon sequentially in ascending order. On the other hand, as illustrated in FIG. 10F, each time the motion detection section 100*a* detects the motion of the printing device 100' to move in the +x direction after first moving in the −x direction, the presentation section 100*c* presents each row of the Gojūon sequentially in descending order. As illustrated in FIG. 10G, when the motion detection section 100*a* detects that the printing device 100' rotates to the left in the x-axis direction, the row of the Gojūon presented at the time is selected. In the state where the row is selected, when the motion detection section 100*a* detects each motion illustrated in FIG. 10H, the acquisition section 100*d* acquires, as input data, a character of the selected row in a column corresponding to the detected motion. Specifically, as illustrated in FIG. 10H, the acquisition section 100*d* acquires, as input data, a character of the "☐a column" in the selected row when the motion detection section 100*a* detects motion in the +z direction, a character of the "□e column" when the motion detection section 100*a* detects rotation to the right in the y-axis direction, a character of the "□i column" when the motion detection section 100*a* detects rotation to the left in the y-axis direction, a character of the "□u column" when the motion detection section 100*a* detects rotation to the left in the x-axis direction, and a character of the "□o column" when the motion detection section 100*a* detects rotation to the right in the x-axis direction, respectively. In the embodiment, the method of acquiring a character is described by taking, as an example, Roman letters composed of the first letter (consonant) and the second letter (vowel) to constitute one character type. However, this is just an example. For example, the presentation section 100*c* may present the alphabetical letters A to Z sequentially in ascending order or descending order of the alphabet when the motion detection section 100*a* detects that the printing device 100' is tilted or moves as illustrated in FIGS. 10A, 10B, 10E, and 10F. In such a case, when the motion detection section 100*a* detects any of the motions illustrated in FIGS. 10D and 10H, the acquisition section 100*d* may switch between the upper case and the lower case.

Third Embodiment

The printing devices 100 and 100' of the above first and second embodiments accept the input of print data or control commands as input data. However, this is just an example, and the input device (printing device) according to the present invention can also accept the input of input data other than print data and control commands. Hereinafter, the function and operation of a printing device 100" which accepts the input of a layout (layout information) as input data will be described.

The physical and functional configurations of the printing device 100" are substantially the same as the physical and functional configurations of the printing device 100 according to the first embodiment, but part of them is different. Like in the first embodiment, the coordinate system illustrated FIGS. 1A and 1B is set to describe the motion of the printing device 100". As illustrated in FIGS. 1A and 1B, the x axis in this coordinate system is set to a width direction as the short-side direction of the printing device 100", the y axis is set to a height direction as the long-side direction of the printing device 100", and the z axis is set to a thickness direction of the printing device 100" in parallel, respectively. Note that G in the figures denotes a directional vector (vertical direction) of the acceleration of gravity.

The storage section 100*b* of the printing device 100" stores layouts a to n illustrated in FIG. 11H to FIG. 11N and FIG. 12H to FIG. 12N as input data candidates to be acquired by the acquisition section 100*d* in association with motions (trajectories) of the printing device 100" illustrated in FIG. 11A to FIG. 11G and FIG. 12A to FIG. 12G, respectively. When the motion detection section 100*a* detects any motion of the printing device 100" as illustrated in FIG. 11A to FIG. 11G and FIG. 12A to FIG. 12G, the acquisition section 100*d* acquires, as input data, a layout stored in the storage section 100*b* in association with the detected motion. Note that the constituent elements of the print data are ten letters ("A," "B," "C," "D, " "E," "F," "G," "H," "I," and "J") in FIG. 11H to FIG. 11N and FIG. 12H to FIG. 12N, and the print data is an array of constituent elements as these ten letters arranged in this order to fall within a printing range of the tape medium 31.

Figure 11A:
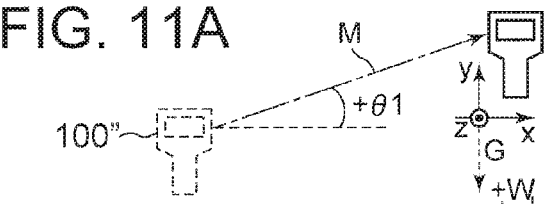
FIG. 11A to FIG. 11G are diagrams illustrating motions of a printing device according to a third embodiment of the present invention.
Figure 11B:
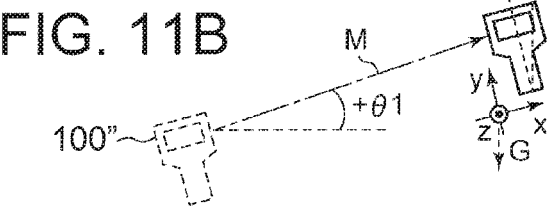
Figure 11C:
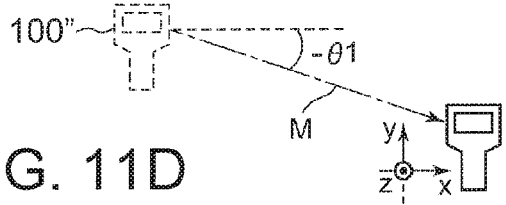
Figure 11D:
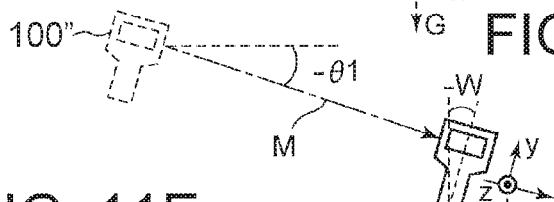
Figure 11E:
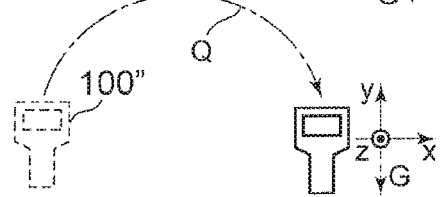
Figure 11F:
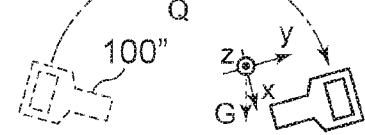
Figure 11G:
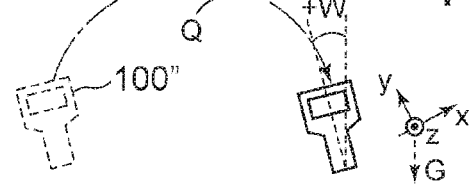
Figure 11H:
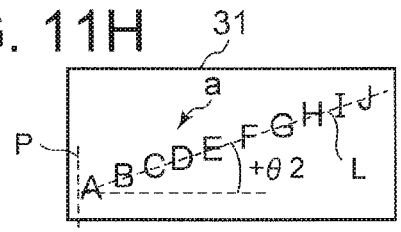
FIG. 11H to FIG. 11N are diagrams illustrating layouts.
Figure 11I:
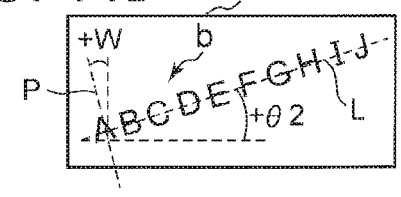

Specifically, as illustrated in FIG. 11A, when the motion detection section 100*a* detects the motion of the printing device 100" to move to draw a straight line M obliquely upward with respect to the horizontal direction as a direction perpendicular to the vertical direction G inside the xy plane of the printing device 100" (i.e., in a synthetic direction of the horizontal direction and the vertical direction) while keeping the +y direction of the printing device 100" in the same direction as a vertically upward direction as a direction opposite to the vertical direction G (where the angle between the horizontal direction and the motion direction along the straight line M is +θ1), the acquisition section 100*d* acquires a layout a illustrated in FIG. 11H as input data (where the angle between the long-side direction of the tape medium 31 and the direction of an array of letters onto the tape medium 31 is +θ2). Further, as illustrated in FIG. 11B, when the motion detection section 100*a* detects the motion of the printing device 100" to move to draw the straight line M obliquely upward with respect to the horizontal direction (where the angle between the horizontal direction and the motion direction along the straight line M is +θ1) while keeping the tilt of the printing device 100" constant (where the angle between the +y direction of the printing device 100" and the vertically upward direction is +W), the acquisition section 100*d* acquires a layout b illustrated in FIG. 11I as input data (where the angle between the long-side direction of the tape medium 31 and the direction of an array of letters onto the tape medium 31 is +θ2). Both of the layouts a and b are layouts in which the printing device 100" prints out each of the constituent elements of the print data to draw a straight line L diagonally right up, which connects the centers of the respective constituent elements of the print data. In the layout a, the printing device 100" prints out each of the constituent elements of print data in such a manner that a longitudinal center line P of each constituent element of the print data (although the longitudinal center line P is attached only to the letter "A" among the ten letters ("A," "B," "C," "D," "E," "A," "B," "C," "D," "E," "F," "G," "H," "I," and "J") as the constituent elements of the print data, the same applies to the other letters) becomes parallel to the width direction of the tape medium 31, respectively. In the layout b, the printing device 100" prints out each of the constituent elements of print data in such a manner that the longitudinal center line P of each constituent element of the print data is tilted at the same angle (+W) with respect to the width direction of the tape medium 31, respectively. When the array of letters will fall within a printing range of the tape medium 31 even if +θ2=+θ1 is set, the angle +θ2 as the tilt of this straight line L with respect to the long-side direction of the tape medium 31 is determined to be +θ2=+θ1. On the other hand, when the array of letters will not fall within the printing range of the tape medium 31 if +θ2=+θ1 is set, the angle +θ2 is determined to be a positive angle whose absolute value is smaller than +θ1 based on the printing range of the tape medium 31 so that both end constituent elements ("A," and "J") will fall within the printing range of the tape medium 31. Note that since the motion of the printing device 100" is free-hand motion, the motion of the printing device 100" may deviate from motion to move to draw an accurate straight line obliquely upward with respect to the horizontal direction. In such a case, for example, two points, namely the starting point and the ending point of the motion of the printing device 100", may be detected to determine a straight line connecting these two points so that this straight line will be adopted as the straight line M, and a direction starting at the starting point of this straight line and ending at the ending point thereof will be adopted as the motion direction.

Figure 11J:
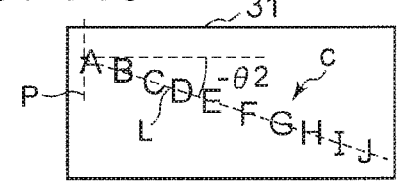
Figure 11K:
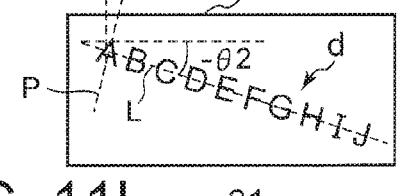

As illustrated in FIG. 11C, when the motion detection section 100a detects the motion of the printing device 100" to move to draw a straight line M obliquely downward with respect to the horizontal direction (i.e., in a synthetic direction of the horizontal direction and the vertical direction G) while keeping the +y direction of the printing device 100" in the same direction as a vertically upward direction (where the angle between the horizontal direction and the motion direction along the straight line M is −θ1), the acquisition section 100d acquires a layout c illustrated in FIG. 11J as input data (where the angle between the long-side direction of the tape medium 31 and the direction of an array of letters onto the tape medium 31 is −θ2). As illustrated in FIG. 11D, when the motion detection section 100a detects the motion of the printing device 100" to move to draw the straight line M obliquely downward with respect to the horizontal direction (where the angle between the horizontal direction and the motion direction along the straight line M is −θ1) while keeping the tilt of the printing device 100" constant (where the angle between the +y direction of the printing device 100" and the vertically upward direction is −W), the acquisition section 100d acquires a layout d illustrated in FIG. 11K as input data (where the angle between the long-side direction of the tape medium 31 and the direction of an array of letters onto the tape medium 31 is −θ2). Both of the layouts c and d are layouts in which the printing device 100" prints out each of the constituent elements of the print data to draw a straight line L diagonally right down, which connects the centers of the respective constituent elements of the print data. In the layout c, the printing device 100" prints out each of the constituent elements of print data in such a manner that the longitudinal center line P of each constituent element of the print data becomes parallel to the width direction of the tape medium 31, respectively. In the layout d, the printing device 100" prints out each of the constituent elements of print data in such a manner that the longitudinal center line P of each constituent element of the print data is tilted at the same angle (−W) with respect to the width direction of the tape medium 31, respectively. When the array of letters will fall within a printing range of the tape medium 31 even if −θ2=−θ1 is set, the angle −θ2 as the tilt of this straight line L with respect to the long-side direction of the tape medium 31 is determined to be −θ2=−θ1. On the other hand, when the array of letters will not fall within the printing range of the tape medium 31 if −θ2=−θ1 is set, the angle −θ2 is determined to be a negative angle whose absolute value is smaller than −θ1 based on the printing range of the tape medium 31 so that both end constituent elements ("A," and "J") will fall within the printing range of the tape medium 31. Note that since the motion of the printing device 100" is free-hand motion, the motion of the printing device 100" may deviate from motion to move to draw an accurate straight line obliquely downward with respect to the horizontal direction. In such a case, for example, two points, namely the starting point and the ending point of the motion of the printing device 100", may be detected to determine a straight line connecting these two points so that this straight line will be adopted as the straight line M, and a direction starting at the starting point of this straight line and ending at the ending point thereof will be adopted as the motion direction.

Figure 11L:
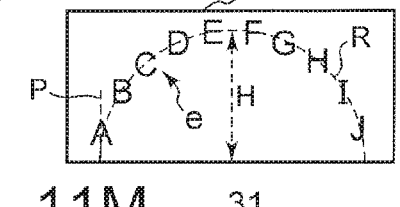
Figure 11M:
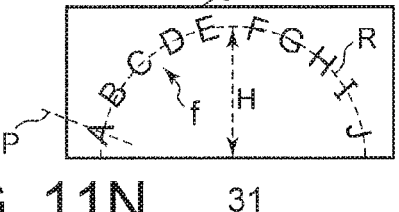
Figure 11N:
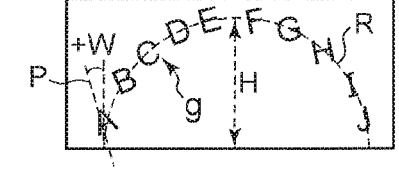

As illustrated in FIG. 11E, when the motion detection section 100a detects the motion of the printing device 100" to move to draw a convex arc Q vertically upward while keeping the +y direction of the printing device 100" in the same direction as the vertically upward direction, the acquisition section 100d acquires a layout e illustrated in FIG. 11L as input data (where the array of letters is drawn in the shape of an arc R convex in the upward direction of the tape medium 31 with respect to the long-side direction of the tape medium 31 as being similar to the arc Q convex in the vertically upward direction). As illustrated in FIG. 11F, when the motion detection section 100a detects the motion of the printing device 100" to move to draw the convex arc Q vertically upward while rotating to the left in the z axis direction, the acquisition section 100d acquires a layout f illustrated in FIG. 11M as input data (where the array of letters is drawn in the shape of an arc R convex in the upward direction of the tape medium 31 with respect to the long-side direction of the tape medium 31 as being similar to the arc Q convex in the vertically upward direction). As illustrated in FIG. 11G, when the motion detection section 100a detects the motion of the printing device 100" to move to draw the convex arc Q vertically upward while keeping the tilt of the printing device 100" constant (where the angle between the +y direction of the printing device 100" and the vertically upward direction is +W), the acquisition section 100d acquires a layout g illustrated in FIG. 11N as input data (where the array of letters is drawn in the shape of an arc R convex in the upward direction of the tape medium 31 with respect to the long-side direction of the tape medium 31 as being similar to the arc Q convex in the vertically upward direction). All of the layouts e to g are layouts in which the printing device 100" prints out each of the constituent elements of the print data to draw the arc R convex in the upward direction of the tape medium 31 with respect to the long-side direction of the tape medium 31, where the curve of the convex arc R connecting the centers of the respective constituent elements of the print data is similar to the arc Q convex in the vertically upward direction. In the layout e, the printing device 100" prints out each of the constituent elements of print data in such a manner that the longitudinal center line P of each constituent element of the print data becomes parallel to the width direction of the tape medium 31, respectively. In the layout f, the printing device 100" prints out each of the constituent elements of print data in such a manner that the longitudinal center line P of each constituent element of the print data passes through the center of the arc R and is tilted at a different angle with respect to the width direction of the tape medium 31, respectively. In the layout g, the printing device 100" prints out each of the constituent elements of print data in such a manner that the longitudinal center line P of each constituent element of the print data is tilted at the same angle (+W) with respect to the width direction of the tape medium 31, respectively. The height H of this arc R with respect to the long-side direction of the tape medium 31 is determined based on the printing range of the tape medium 31 in such a manner that both end constituent elements ("A" and "J") and center constituent elements ("E" and "F") fall within the printing range of the tape medium 31. Note that since the motion of the printing device 100" is free-hand motion, the motion of the printing device 100" may deviate from motion to move to draw an accurate arc convex in the vertically upward direction. In such a case, for example, three points, namely the starting point, the highest point of the vertically upward direction, and the ending point in the motion of the printing device 100", may be detected to determine a circumscribed circle passing through these three points so that an arc starting at the starting point, passing through the highest point of the vertically upward direction, and ending at the ending point in this circumscribed circle will be adopted as the arc Q.

Figure 12A:
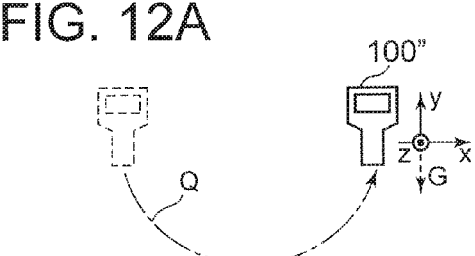
FIG. 12A to FIG. 12G are diagrams illustrating motions of the printing device according to the third embodiment of the present invention.
Figure 12B:
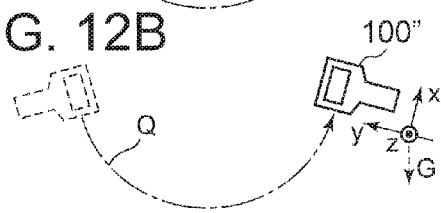
Figure 12C:
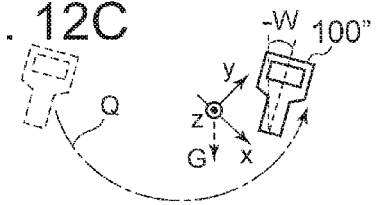
Figure 12D:
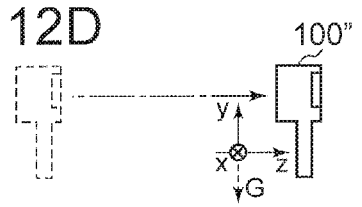
Figure 12E:
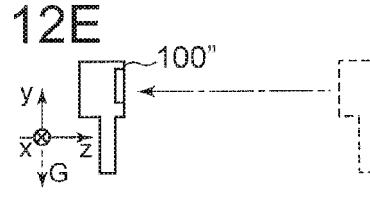
Figure 12F:
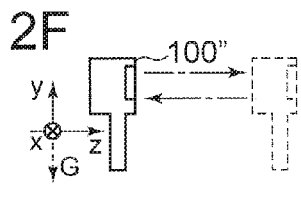
Figure 12G:
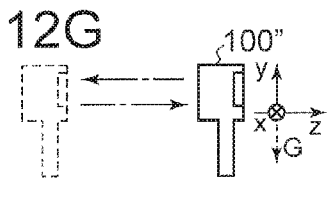
Figure 12H:
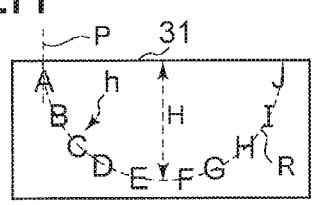
FIG. 12H to FIG. 12N are diagrams illustrating layouts.
Figure 12I:
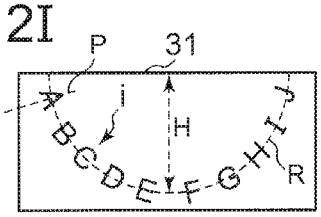
Figure 12J:
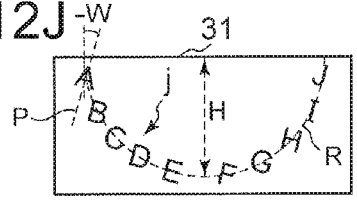

As illustrated in FIG. 12A, when the motion detection section 100a detects the motion of the printing device 100" to move to draw a convex arc Q in the vertical direction G while keeping the +y direction of the printing device 100" in the same direction as the vertically upward direction, the acquisition section 100d acquires a layout h illustrated in FIG. 12H as input data (where the array of letters is drawn in the shape of an arc R convex in the downward direction of the tape medium 31 with respect to the long-side direction of the tape medium 31 as being similar to the arc Q convex in the vertical direction G). As illustrated in FIG. 12B, when the motion detection section 100a detects the motion of the printing device 100" to move to draw the arc Q convex in the vertical direction G while rotating to the right in the z axis direction, the acquisition section 100d acquires a layout i illustrated in FIG. 12I (where the array of letters is drawn in the shape of an arc R convex in the downward direction of the tape medium 31 with respect to the long-side direction of the tape medium 31 as being similar to the arc Q convex in the vertical direction G). As illustrated in FIG. 12C, when the motion detection section 100a detects the motion of the printing device 100" to move to draw the arc Q convex in the vertical direction G while keeping the tilt of the printing device 100" constant (where the angle between the +y direction of the printing device 100" and the vertically upward direction is −W), the acquisition section 100d acquires a layout j illustrated in FIG. 12J as input data (where the array of letters is drawn in the shape of an arc R in the downward direction of the tape medium 31 with respect to the long-side direction of the tape medium 31 as being similar to the arc Q convex in the vertical direction G). All of the layouts h to j are layouts in which the printing device 100" prints out each of the constituent elements of the print data to draw the arc R convex in the downward direction of the tape medium 31 with respect to the long-side direction of the tape medium 31, where the curve of the convex arc R connecting the centers of the respective constituent elements of the print data is similar to the arc Q convex in the vertical direction G. In the layout h, the printing device 100" prints out each of the constituent elements of print data in such a manner that the longitudinal center line P of each constituent element of the print data becomes parallel to the width direction of the tape medium 31, respectively. In the layout i, the printing device 100" prints out each of the constituent elements of print data in such a manner that the longitudinal center line P of each constituent element of the print data passes through the center of the arc R and is tilted at a different angle with respect to the width direction of the tape medium 31, respectively. In the layout j, the printing device 100" prints out each of the constituent elements of print data in such a manner that the longitudinal center line P of each constituent element of the print data is tilted at the same angle (−W) with respect to the width direction of the tape medium 31, respectively. The height H of this arc R with respect to the long-side direction of the tape medium 31 is determined based on the printing range of the tape medium 31 in such a manner that both end constituent elements ("A" and "J") and center constituent elements ("E" and "F") fall within the printing range of the tape medium 31. Note that since the motion of the printing device 100" is free-hand motion, the motion of the printing device 100" may deviate from motion to move to draw an accurate arc convex in the vertical direction G. In such a case, for example, three points, namely the starting point, the highest point of the vertical direction G, and the ending point in the motion of the printing device 100", may be detected to determine a circumscribed circle passing through these three points so that an arc starting at the starting point, passing through the highest point of the vertical direction G, and ending at the ending point in this circumscribed circle will be adopted as the arc Q.

Figure 12K:
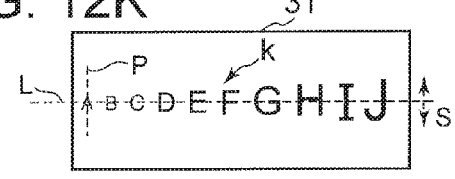
Figure 12L:
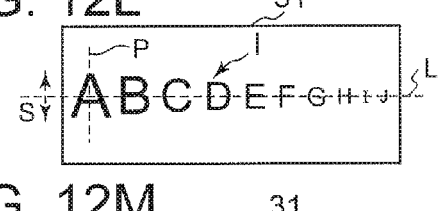

As illustrated in FIG. 12D, when the motion detection section 100a detects the motion of the printing device 100" to move in the +z direction while keeping the +y direction of the printing device 100" in the same direction as the vertically upward direction, the acquisition section 100d acquires a layout k as illustrated in FIG. 12K as input data. As illustrated in FIG. 12E, when the motion detection section 100a detects the motion of the printing device 100" to move in the −z direction while keeping the +y direction of the printing device 100" in the same direction as the vertically upward direction, the acquisition section 100d acquires a layout l illustrated in FIG. 12L as input data. Both of the layouts k and l are layouts in which the printing device 100" prints out each of the constituent elements of the print data in such a manner that a line connecting the centers of the respective constituent elements forms a straight line L parallel to the long-side direction of the tape medium 31 and the longitudinal center line P of each constituent element of the print data becomes parallel to the width direction of the tape medium 31, respectively. In the layout k, the printing device 100" prints out each of the constituent elements of print data to become larger in size gradually from the starting point ("A") of the print data to the ending point ("J") of the print data. Further, as the speed of the motion to move in the +z direction becomes higher, the printing device 100" may print out the starting point ("A") of the print data in a smaller size and the ending point ("J") of the print data in a larger size. In the layout l, the printing device 100" prints out each of the constituent elements of print data to become smaller in size gradually from the starting point ("A") of the print data to the ending point ("J") of the print data. Further, as the speed of the motion to move in the −z direction becomes higher, the printing device 100" may print out the starting point ("A") of the print data in a larger size and the ending point ("J") of the print data in a smaller size. Note that the height S of the largest sized constituent element ("J" in the layout k and "A" in the layout l) is determined based on the printing range of the tape medium 31 to fall within the printing range of the tape medium 31.

Figure 12M:
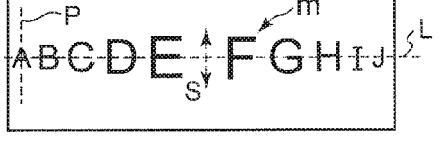
Figure 12N:
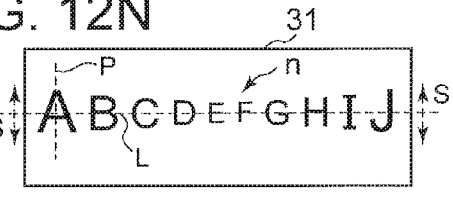

As illustrated in FIG. 12F, when the motion detection section 100a detects the motion of the printing device 100" to first move in the +z direction while keeping the +y direction of the printing device 100" in the same direction as the vertically upward direction and then move in the −z direction, the acquisition section 100d acquires a layout m illustrated in FIG. 12M as input data. As illustrated in FIG. 12G, when the motion detection section 100a detects the motion of the printing device 100" to first move in the −z direction while keeping the +y direction of the printing device 100" in the same direction as the vertically upward direction and then move in the +z direction, the acquisition section 100d acquires a layout n illustrated in FIG. 12N as input data. Both of the layouts m and n are layouts in which the printing device 100" prints out each of the constituent elements of the print data in such a manner that a line connecting the centers of the respective constituent elements forms a straight line L parallel to the long-side direction of the tape medium 31 and the longitudinal center line P of each constituent element of the print data becomes parallel to the width direction of the tape medium 31, respectively. In the layout m, the printing device 100" prints out each of the constituent elements of print data to become larger in size gradually from the starting point ("A") of the print data to the centers ("E" and "F") of the print data, and smaller in size gradually from the centers ("E" and "F") of the print data to the ending point ("J") of the print data. Further, as the speed of the motion to move in the +z direction and the speed of the motion to move in the −z direction become higher, the printing device 100" may print out the starting point ("A") of the print data in a smaller size, the centers ("E" and "F") of the pint data in a larger size, and the ending point ("J") of the print data in a smaller size. In the layout n, the printing device 100" prints out each of the constituent elements of print data to become smaller in size gradually from the starting point ("A") of the print data to the centers ("E" and "F") of the print data, and larger in size gradually from the centers ("E" and "F") of the print data to the ending point ("J") of the print data. Further, as the speed of the motion to move in the −z direction and the speed of the motion to move in the +z direction become higher, the printing device 100" may print out the starting point ("A") of the print data in a larger size, the centers ("E" and "F") of the pint data in a smaller size, and the ending point ("J") of the print data in a larger size. Note that the height S of the largest sized constituent elements (""E" and "F" in the layout m, and the "A" and "J" in the layout n) is determined based on the printing range of the tape medium 31 to fall within the printing range of the tape medium 31.

The details of input processing performed by the printing device 100" having the above physical and functional configurations will be described below with reference to a flowchart of FIG. 13.

The storage section 100b of the printing device 100" acquires in advance from the outside and prestores layouts and printing patterns as input data candidates.

Figure 13:
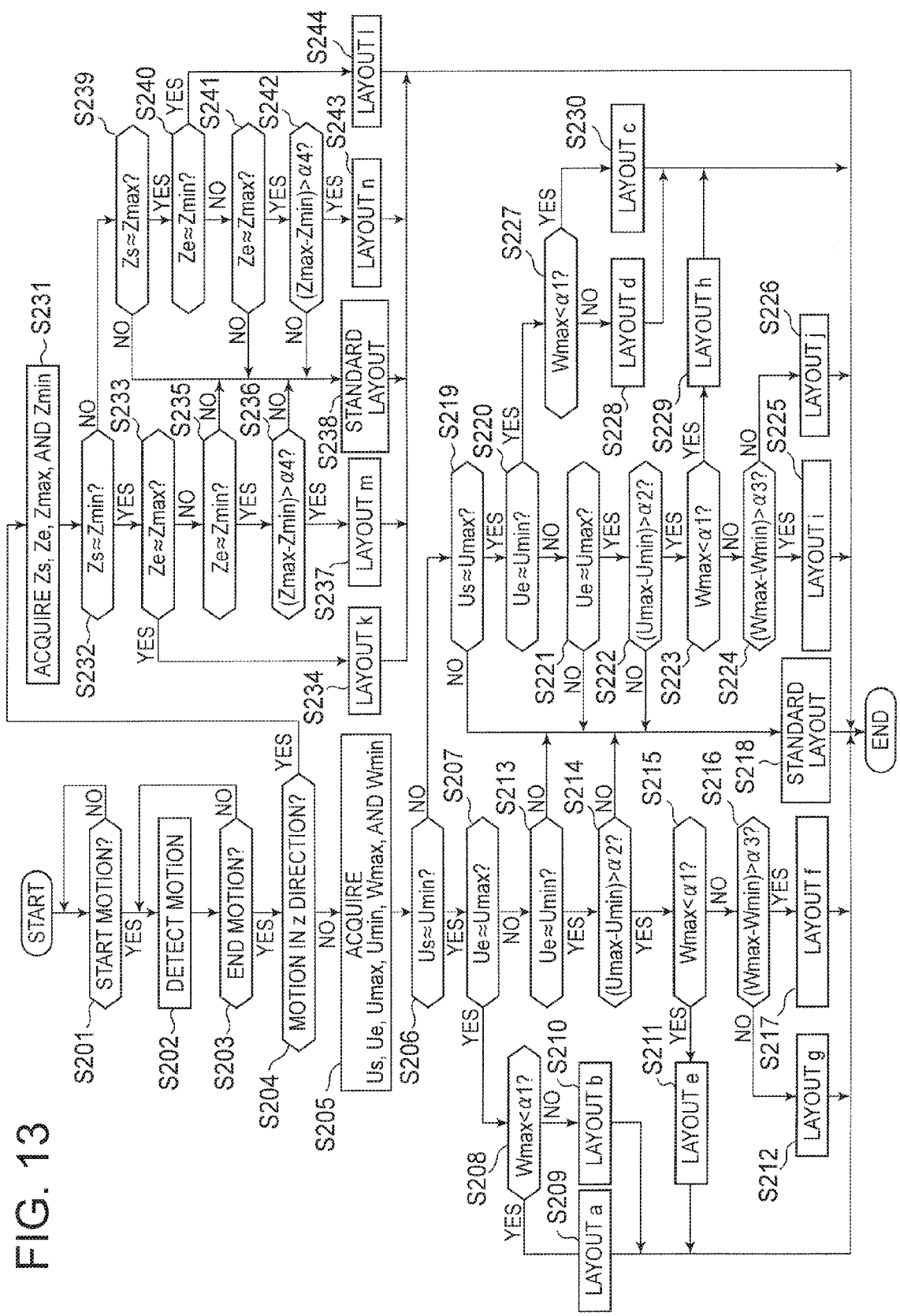
FIG. 13 is a flowchart for describing input processing performed by the printing device according to the third embodiment of the present invention.

When a user desired to input a layout to the printing device 100" turns on the printing device 100", the printing device 100" starts print processing illustrated in a flowchart of FIG. 13.

When input processing is started, the motion detection section 100a first determines whether predetermined start motion is detected (S201). In the embodiment, the motion of the printing device 100" to move in the ±z directions twice is set as the start motion. When determining that no start motion is detected (NO in step S201), the motion detection section 100a repeats the processing in step S201 until the start motion is detected. When determining that the start motion is detected (YES in step S201), the motion detection section 100a detects the motion of the printing device 100" (step S202).

Next, the motion detection section 100a determines whether predetermined end motion is detected (step S203). In the embodiment, the same motion as the start motion (the motion of the main body of the printing device 100" to move in the ±z directions twice) is set as the end motion. When it is determined that no end motion is detected (NO in step S203), the procedure returns to step S202. The motion detection section 100a repeats the processing in steps S202 and S203 until the end motion is detected. When determining that the end motion is detected (YES in step S203), the motion detection section 100a determines whether motion in the z direction is detected (step S204).

When determining that no motion in the z direction is detected (NO in step S204), the motion detection section 100a acquires, as feature values indicating the motion of the printing device 100", a height Us of the starting point in the vertically upward direction, a height Ue of the ending point in the vertically upward direction, the maximum value Umax of the height of the vertically upward direction, the minimum value Umin of the height of the vertically upward direction, the maximum value Wmax of the absolute value of the tilt, and the minimum value Wmin of the absolute value of the tilt (step S205).

The height Us of the starting point in the vertically upward direction is the height of the printing device 100" in the vertically upward direction at the point when the start motion is detected in step S201. The height Ue of the ending point in the vertically upward direction is the height of the printing device 100" in the vertically upward direction at the point when the end motion is detected in step S203. The maximum value Umax and minimum value Umin of the height in the vertically upward direction are the maximum value and minimum value of the height of the printing device 100" in the vertically upward direction detected by the motion detection section 100a after the start motion is detected in step S201 until the end motion is detected in step S203, respectively. The maximum value Wmax of the absolute value of the tilt and the minimum value Wmin of the absolute value of the tilt are the maximum value and minimum value of the absolute value of a tilt W of the printing device 100" detected by the motion detection section 100a after the start motion is detected in step S201 until the end motion is detected in step S203, respectively. Here, the tilt W of the printing device 100" means the angle between the +y direction and the vertically upward direction of the printing device 100".

The motion detection section 100a has the acceleration sensor 6 detect the acceleration of gravity to acquire the tilt W of the printing device 100". Further, the motion detection section 100a integrates components of the accelerations of gravity in the vertical direction G detected by the acceleration sensor 6 to acquire the height of the printing device 100" in the vertically upward direction.

The motion detection section 100a determines whether the height Us of the starting point in the vertically upward direction and the minimum value Umin of the height of the vertically upward direction substantially match with each other (step S206). Hereinafter, the expression that two values "substantially match with each other" means that a difference between the two values is equal to or less than a predetermined threshold value.

When determining that the height Us of the starting point in the vertically upward direction and the minimum value Umin of the height of the vertically upward direction substantially match with each other (YES in step S206), the motion detection section 100a determines whether the height Ue of the ending point in the vertically upward direction and the maximum value Umax of the height of the vertically upward direction substantially match with each other (step S207).

When it is determined that the height Ue of the ending point in the vertically upward direction and the maximum value Umax of the height of the vertically upward direction substantially match with each other (YES in step S207), it is considered that the motion of the printing device 100" detected by the motion detection section 100a is either the motion illustrated in FIG. 11A or the motion illustrated in FIG. 11B. Based on the tilt W of the printing device 100", the motion detection section 100a determines which motion is detected.

Specifically, the motion detection section 100a determines whether the maximum value Wmax of the absolute value of the tilt is smaller than a predetermined threshold value α1 (step S208). When it is determined that the maximum value Wmax of the absolute value of the tilt is smaller than the threshold value α1 (YES in step S208), there is a high possibility that the user would intend to move the printing device 100" while keeping it vertical. Therefore, the motion detection section 100a determines that the detected motion is the motion illustrated in FIG. 11A, the acquisition section 100d acquires, as input data, the layout a stored in the storage section 100b in association with this motion (step S209), and the input processing is ended. On the other hand, when it is determined that the maximum value Wmax of the absolute value of the tilt is equal to or larger than the threshold value α1 (NO in step S208), there is a high possibility that the user would intend to move the printing device 100" while keeping the tilt of the printing device 100" constant. Therefore, the motion detection section 100a determines that the detected motion is the motion illustrated in FIG. 11B, the acquisition section 100d acquires, as input data, the layout b stored in the storage section 100b in association with this motion (step S210), and the input processing is ended.

When determining in step S207 that the height Ue of the ending point in the vertically upward direction and the maximum value Umax of the height of the vertically upward direction do not match with each other (NO in step S207), the motion detection section 100a determines whether the height Ue of the ending point in the vertically upward direction and the minimum value Umin of the height of the vertically upward direction substantially match with each other (step S213). When it is determined that both do not match (NO in step S213), since the motion detected by the motion detection section 100a does not match with any motion of the printing device 100" stored in the storage section 100b, the acquisition section 100d acquires, as input data, a standard layout prestored in the storage section 100b (step S218), and the input processing is ended. In the standard layout, respective constituent elements of print data are printed out all in the same size in parallel with the long-side direction of the tape medium 31.

When determining that the height Ue of the ending point in the vertically upward direction and the minimum value Umin of the height of the vertically upward direction substantially match with each other (YES in step S213), the motion detection section 100a determines whether a difference between the maximum value Umax of the height of the vertically upward direction and the minimum value Umin of the height of the vertically upward direction is larger than a predetermined threshold value α2 (step S214). When it is determined that the difference is equal to or smaller than the threshold value α2 (NO in step S214), since there is a high possibility that the user would intend to move the printing device 100" horizontally, the acquisition section 100d acquires the standard layout as input data (step S218), and the input processing is ended.

When determining that the difference is larger than the threshold value α2 (YES in step S214), the motion detection section 100a determining whether the maximum value Wmax of the absolute value of the tilt is smaller than the threshold value α1 (step S215). When determining that the maximum value Wmax of the absolute value of the tilt is smaller than the threshold value α1 (YES in step S215), since there is a high possibility that the user would intend to move the printing device 100" while keeping it vertical, the motion detection section 100a determines that the detected motion is the motion illustrated in FIG. 11E. In response to this, the acquisition section 100d acquires the layout e as input data (step S211), and the input processing is ended.

When determining that the maximum value Wmax of the absolute value of the tilt is equal to or larger than the threshold value α1 (NO in step S215), the motion detection section 100a determines whether a difference between the maximum value Wmax of the absolute value of the tilt and the minimum value Wmin of the absolute value of the tilt is larger than a predetermined threshold value α3 (step S216). When determining that the difference is equal to or smaller than the threshold value α3 (NO in step S216), since there is a high possibility that the user would intend to move the printing device 100" while keeping the tilt of the printing device 100" constant, the motion detection section 100a determines that the detected motion is the motion illustrated in FIG. 11G. In response to this, the acquisition section 100d acquires the layout g as input data (step S212), and the input processing is ended. On the other hand, when determining that the difference is larger than the threshold value α3 (YES in step S216), since there is a high possibility that the user would intend to move the printing device 100" while rotating the printing device 100", the motion detection section 100a determines that the detected motion is the motion illustrated in FIG. 11F. In response to this, the acquisition section 100d acquires the layout f (step S217), and the input processing is ended.

When determining in step S206 that the height Us of the starting point in the vertically upward direction and the minimum value Umin of the height of the vertically upward direction do not match with each other (NO in step S206), the motion detection section 100a determines whether the height Us of the starting point in the vertically upward direction and the maximum value Umax of the height of the vertically upward direction substantially match with each other (step S219). When it is determined that both do not match (NO in step S219), the acquisition section 100d acquires the standard layout as input data (step S218), and the input processing is ended.

When determining that the height Us of the starting point in the vertically upward direction and the maximum value Umax of the height of the vertically upward direction substantially match with each other (YES in S219), the motion detection section 100a determines whether the height Ue of the ending point in the vertically upward direction and the minimum value Umin of the height of the vertically upward direction substantially match with each other (step S220). When determining that both match (YES in step S220), the motion detection section 100a determines whether the maximum value Wmax of the absolute value of the tilt is smaller than the threshold value α1 (step S227).

When determining that the maximum value Wmax of the absolute value of the tilt is smaller than the threshold value α1 (YES in step S227), the motion detection section 100a determines that the detected motion is the motion illustrated in FIG. 11C. In response to this, the acquisition section 100d acquires the layout c as input data (step S230), and the input processing is ended. When determining that the maximum value Wmax of the absolute value of the tilt is equal to or larger than the threshold value α1 (NO in step S227), the motion detection section 100a determines that the detected motion is the motion illustrated in FIG. 11D. In response to this, the acquisition section 100d acquires the layout d as input data (step S228), and the input processing is ended.

When determining in step S220 that the height Ue of the ending point in the vertically upward direction and the minimum value Umin of the height of the vertically upward direction do not match with each other (NO in step S220), the motion detection section 100a determines whether the height Ue of the ending point in the vertically upward direction and the maximum value Umax of the height of the vertically upward direction substantially match with each other (step S221). When it is determined that both do not match (NO in step S221), the acquisition section 100d acquires the standard layout as input data (step S218), and the input processing is ended.

When determining that the height Ue of the ending point in the vertically upward direction and the maximum value Umax of the height of the vertically upward direction substantially match with each other (YES in step S221), the motion detection section 100a determines whether a difference between the maximum value Umax of the height of the vertically upward direction and the minimum value Umin of the height of the vertically upward direction is larger than the threshold value α2 (step S222). When it is determined that the difference is equal to or smaller than the threshold value α2 (NO in step S222), the acquisition section 100d acquires the standard layout as input data (step S218), and the input processing is ended.

When determining that the difference between the maximum value Umax of the height of the vertically upward direction and the minimum value Umin of the height of the vertically upward direction is larger than the threshold value α2 (YES in step S222), the motion detection section 100a determines whether the maximum value Wmax of the absolute value of the tilt is smaller than the threshold value α1 (step S223). When determining that the maximum value Wmax of the absolute value of the tilt is smaller than the threshold value α1 (YES in step S223), the motion detection section 100a determines that the detected motion is the motion illustrated in FIG. 12A. In response to this, the acquisition section 100d acquires the layout h as input data (step S229), and the input processing is ended.

When determining that the maximum value Wmax of the absolute value of the tilt is equal to or larger than the threshold value α1 (NO in step S223), the motion detection section 100a determines whether a difference between the maximum value Wmax of the absolute value of the tilt and the minimum value Wmin of the absolute value of the tilt is larger than the threshold value α3 (step S224). When determining that the difference is equal to or smaller than the threshold value α3 (NO in step S224), the motion detection section 100a determines that the detected motion is the motion illustrated in FIG. 12C. In response to this, the acquisition section 100d acquires the layout j as input data (step S226), and the input processing is ended. On the other hand, when determining that the difference between the maximum value Wmax of the absolute value of the tilt and the minimum value Wmin of the absolute value of the tilt is larger than the threshold value α3 (YES in step S224), the motion detection section 100a determines that the detected motion is the motion illustrated in FIG. 12B.

In response to this, the acquisition section 100d acquires the layout i as input data (step S225), and the input processing is ended.

When determining in step S204 that the motion in the z direction is detected (YES in step S204), the motion detection section 100a acquires, as feature values indicating the motion of the printing device 100", the z-coordinate Zs of the starting point, the z-coordinate Ze of the ending point, the maximum value Zmax of the z-coordinate, and the minimum value Zmin of the z-coordinate (step S231).

The z-coordinate Zs of the starting point is the z-coordinate of the printing device 100" at the point when the start motion is detected in step S201. The z-coordinate Ze of the ending point is the z-coordinate of the printing device 100" at the point when the end motion is detected in step S203. The maximum value Zmax of the z-coordinate and the minimum value Zmin of the z-coordinate are the maximum value and minimum value of the z-coordinate of the printing device 100" detected by the motion detection section 100a after the start motion is detected in step S201 until the end motion is detected in step S203. The motion detection section 100a integrates accelerations detected by the acceleration sensor 6 to acquire the z-coordinate of the printing device 100".

The motion detection section 100a determines whether the z-coordinate Zs of the starting point and the minimum value Zmin of the z-coordinate substantially match with each other (step S232). When determining that both substantially match (YES in step S232), the motion detection section 100a determines whether the z-coordinate Ze of the ending point and the maximum value Zmax of the z-coordinate substantially match with each other (step S233). When determining that both match (YES in step S233), the motion detection section 100a determines that the detected motion is the motion illustrated in FIG. 12D. In response to this, the acquisition section 100d acquires the layout k as input data (step S234), and the input processing is ended.

When determining that the z-coordinate Ze of the ending point and the maximum value Zmax of the z-coordinate do not match with each other (NO in step S233), the motion detection section 100a determines whether the z-coordinate Ze of the ending point and the minimum value Zmin of the z-coordinate substantially match with each other (step S235). When it is determined that both do not match (NO in step S235), since the detected motion does not match with any motion of the printing device 100" stored in the storage section 100b, the acquisition section 100d acquires the standard layout as input data (step S238), and the input processing is ended.

When determining that the z-coordinate Ze of the ending point and the minimum value Zmin of the z-coordinate substantially match with each other (YES in step S235), the motion detection section 100a determines whether a difference between the maximum value Zmax of the z-coordinate and the minimum value Zmin of the z-coordinate is larger than a predetermined threshold value α4 (step S236). When it is determined that the difference is equal to or smaller than the threshold value α4 (NO in step S236), since there is a high possibility that the user would intend to move the printing device 100" in the z direction, the acquisition section 100d acquires the standard layout as input data (step S238), and the input processing is ended.

When determining that the difference between the maximum value Zmax of the z-coordinate and the minimum value Zmin of the z-coordinate is larger than the threshold value α4 (YES in step S236), the motion detection section 100a determines that the detected motion is the motion illustrated in FIG. 12F. In response to this, the acquisition section 100d acquires the layout m as input data (step S237), and the input processing is ended.

When determining in step S232 that the z-coordinate Zs of the starting point and the minimum value Zmin of the z-coordinate do not match with each other (NO in step S232), the motion detection section 100a determines whether the z-coordinate Zs of the starting point and the maximum value Zmax of the z-coordinate substantially match with each other (step S239). When it is determined that both do not match (NO in step S239), the acquisition section 100d acquires the standard layout as input data (step S238), and the input processing is ended.

When determining that the z-coordinate Zs of the starting point and the maximum value Zmax of the z-coordinate substantially match with each other (YES in step S239), the motion detection section 100a determines whether the z-coordinate Ze of the ending point and the minimum value Zmin of the z-coordinate substantially match with each other (step S240). When determining that both substantially match with each other (YES in step S240), the motion detection section 100a determines that the detected motion is the motion illustrated in FIG. 12E. In response to this, the acquisition section 100d acquires the layout 1 as input data (step S244), and the input processing is ended.

When determining that the z-coordinate Ze of the ending point and the minimum value Zmin of the z-coordinate do not match with each other (NO in step S240), the motion detection section 100a determines whether the z-coordinate Ze of the ending point and the maximum value Zmax of the z-coordinate substantially match with each other (step S241). When it is determined that both do not match (NO in step S241), the acquisition section 100d acquires the standard layout as input data (step S238), and the input processing is ended.

When determining that the z-coordinate Ze of the ending point and the maximum value Zmax of the z-coordinate substantially match with each other (YES in step S241), the motion detection section 100a determines whether a difference between the maximum value Zmax of the z-coordinate and the minimum value Zmin of the z-coordinate is larger than the threshold value $\alpha 4$ (step S242). When it is determined that the difference is equal to or smaller than the threshold value $\alpha 4$ (NO in step S242), the acquisition section 100d acquires the standard layout as input data (step S238), and the input processing is ended.

When determining that the maximum value Zmax of the z-coordinate and the minimum value Zmin of the z-coordinate is larger than the threshold value $\alpha 4$ (YES in step S242), the motion detection section 100a determines that the detected motion is the motion illustrated in FIG. 12G. In response to this, the acquisition section 100d acquires the layout n as input data (step S243), and the input processing is ended.

After completion of the input processing, the printing device 100" performs print processing illustrated in the flowchart of FIG. 6. When an instruction to start printing is accepted in the print processing, print data is printed out in a layout input in the input processing. The print data may be printed out in the input layout immediately after the completion of the input processing (without receiving the instruction to start printing again). According to the former aspect, print data is selectable to enable printing of plural pieces of print data in the same layout. According to the latter aspect, the trouble of instructing printing again can be saved.

As described above, the printing device 100" according to the embodiment acquires a layout of print data based on the motion of the main body. In other words, the printing device 100" can accept the input of a layout (input data) with a simple operation.

In the embodiment, plural layouts are prestored to acquire any one of these layouts as input data. However, this is just an example, and the printing device 100" can also accept the input of a layout without prestoring the layouts.

Figure 14:
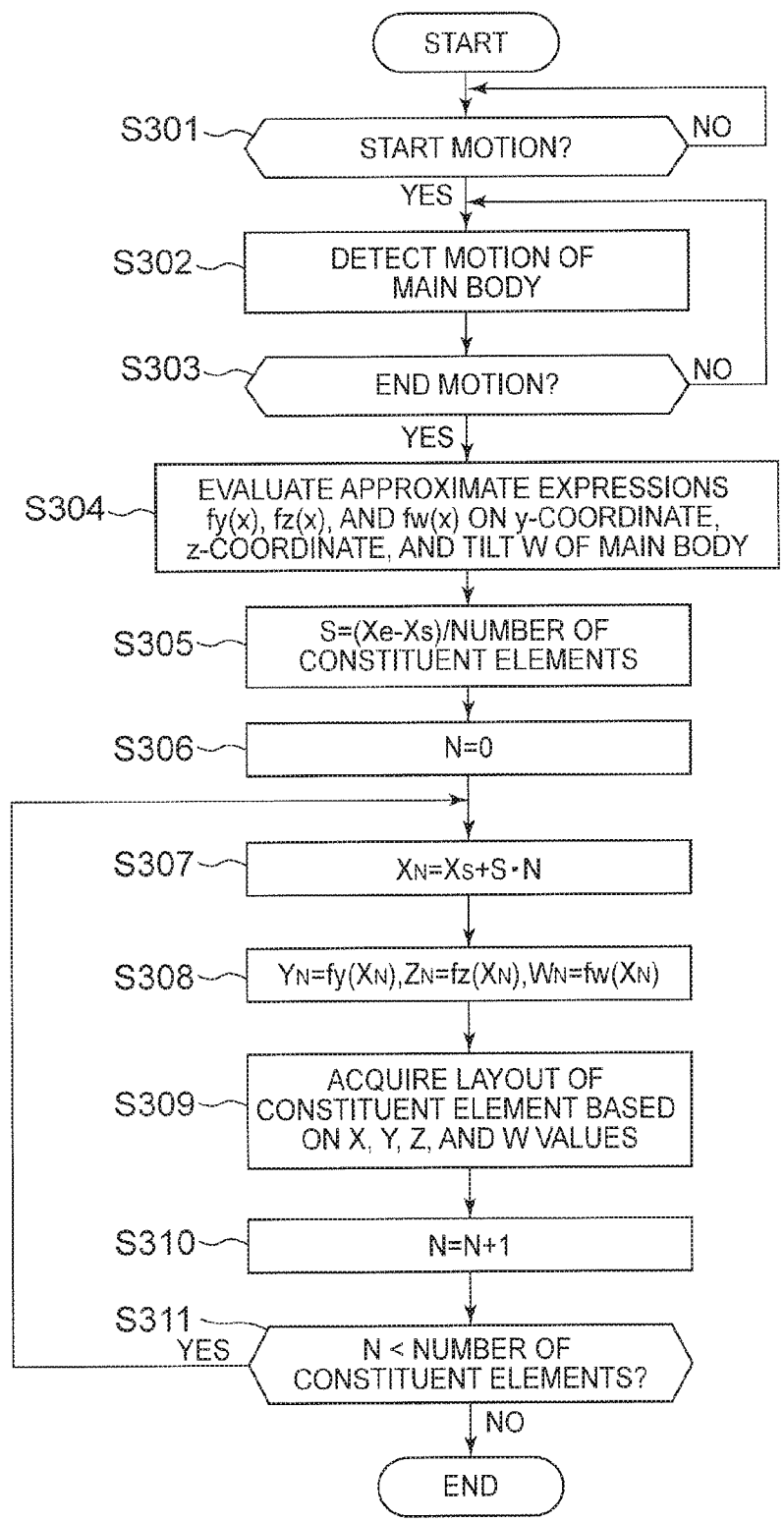
FIG. 14 is a flowchart for describing another method of inputting a layout.

For example, the printing device 100" can acquire a trajectory of the main body as a layout. In this case, the printing device 100" performs input processing as illustrated in a flowchart of FIG. 14. When a user desired to input of a layout turns on the printing device 100", the printing device 100" start the input processing illustrated in the flowchart of FIG. 14.

When the input processing is started, the motion detection section 100a first determines whether predetermined start motion (for example, the motion of the printing device 100" to rotate to the left in the x axis direction after moving in the +z direction) is detected (step S301). When it is determined that the start motion is not detected (NO in step S301), the processing in step S301 is repeated until the detection of the start motion is determined. When the start motion is detected (YES in step S301), the motion detection section 100a detects the motion of the printing device 100" (step S302).

Next, the motion detection section 100a determines whether predetermined end motion (for example, the motion of the printing device 100" to rotate to the left in the x axis direction after moving in the +z direction) is detected (step S303). When it is determined that the end motion is not detected (NO in step S303), the procedure returns to the processing in step S302.

When it is determined that the end motion is detected (YES in step S303), the control unit 40 acquires an approximate expression fy(x) for the y-coordinate, an approximate expression fz(x) for the z-coordinate, and an approximate expression fw(x) for the tilt based on the motion of the printing device 100" detected during a period after the detection of the start motion is determined in step S301 until the detection of the end motion is determined in step S303 (step S304). Specifically, the control unit 40 integrates accelerations detected by the acceleration sensor 6 to acquire the coordinates (x, y, and z) and tilt W of the printing device 100" in order to acquire an approximate function using any known technique (for example, the least-square method) based on these coordinates and tilt. Here, the tilt W of the printing device 100" means the angle between the +y direction of the printing device 100" and the vertically upward direction.

Next, the control unit 40 acquires a width S occupied by each of the constituent elements of print data when being printed on the tape medium 31 (step S305). Specifically, the control unit 40 acquires the width S by dividing a width (Xe−Xs), occupied by the entire print data on the tape medium 31, by the number of constituent elements. Here, (Xe−Xs) is a difference between the x-coordinate Xe of the printing device 100" at the point when the end motion is detected in step S303 and the x-coordinate Xs of the printing device 100" at the point when the start motion is detected in step S301.

After that, the control unit 40 performs processing in steps S306 to S311 to acquire a layout of each of the constituent elements of the print data in order to acquire a layout of the print data. First, the control unit 40 sets a counter N to 0 (step S306).

Next, a product of the width S occupied by each constituent element and the counter N is added to the x-coordinate Xs of the printing device 100" at the point when the start motion is detected in step S301 to acquire an x-coordinate XN of a constituent element being currently processed (step S307).

The control unit 40 substitutes the x-coordinate XN acquired in step S307 into the approximate expressions fy(x), fz(x), and fw(x) acquired in step S304 to acquire a y-coordinate YN, a z-coordinate ZN, and a tilt WN of the constituent element being currently processed (step S308).

Based on the x-coordinate XN, the y-coordinate YN, the z-coordinate ZN, and the tilt WN of the constituent element, the control unit 40 acquires a layout of the constituent element being currently processed (step S309). Specifically, the control unit 40 lays out the constituent element on an upper side of the tape medium 31 as the constituent element has a larger value of the y-coordinate and on a lower side of the tape medium 31 as the constituent element has a smaller value of the y-coordinate. The control unit 40 also lays out the constituent element in a larger size as the constituent element has a larger value of the z-coordinate and in a smaller size as the constituent element has a smaller value of the z-coordinate. Further, the control unit 40 lays out each of the constituent elements to have a tilt W.

Next, the printing device 100" adds 1 to the counter N (step S310), and determines whether the added value of the counter N is smaller than the number of constituent elements (step S311). When it is determined that the value of the counter N is smaller than the number of constituent elements (YES in step S311), the procedure returns to step S307. When it is determined that the value of the counter N is equal to or larger than the number of constituent elements (NO in step S311), the input processing is ended.

According to this aspect, a layout can be acquired based on a trajectory of the own device. Therefore, a variety of layouts can be acquired compared with the previous printing device 100" according to the embodiment to acquire any one of prestored layouts as input data. Since there is no need to prestore layouts, the storage capacity can be saved compared with the previous printing device 100" according to the embodiment.

While the embodiments of the present invention are described above, the embodiments are just examples, and the scope of the present invention is not limited to these embodiments. In other words, the embodiments of the present invention can be applied in various ways, and any kind of embodiment can be included in the scope of the present invention.

For example, in the aforementioned embodiments, the description is made by using the printing device 100 in the form of a label printer as an example of the input device according to the present invention. However, this is just an example. The input device according to the present invention is not limited to the printing device such as the label printer, and can be realized by any other electronic device, such as a smartphone, a computer, or a PDA (Personal Digital Assistance).

Specifically, a program, which causes the smartphone, the computer, the PDA, and the like to operate as the input device according to the present invention, can be stored on a recording medium (such as a memory card, a CD-ROM (Compact Disc Read-Only Memory), or a DVD-ROM (Digital Versatile Disc Read-Only Memory)) readable by these electronic devices, distributed, and installed to implement the input device according to the present invention.

Alternatively, the above program may be stored in a storage device (such as a disk device) contained in a server on a communication network such as the Internet so that the smartphone, the computer, the PDA, and the like will download this program to implement the input device according to the present invention.

When the function of the input device according to the present invention is implemented by being shared between an operating system (OS) and an application program, or by the operating system and the application program in cooperation with each other, only the application program may be stored on a recording medium or in a storage device.

Further, the application program may be delivered through a communication network by superimposing the application program on a carrier wave. For example, the application program may be posted in a bulletin board system (BBS) on the communication network so that the application program will be delivered through the network.

Then, this application program may be installed on a computer and started to run under the control of the OS in the same manner as any other application program to implement the input device of the present invention.

While the present invention is described above based on the specific embodiments, it is needless to say that the technical scope of the present invention is not limited to the aforementioned embodiments.

It will be obvious to those skilled in the art that various changes or improvements can be added to the above specific embodiments. It will become apparent from appended claims that forms to which such changes or improvements are added are also included in the technical scope of the present invention.

What is claimed is:

1. A printing device comprising:
   a motion detection sensor which detects at least one motion of the printing device to move in a three-dimensional space;
   a control unit which acquires, from a memory storing plural motions detectable by the motion detection sensor and plural control commands in association with each other, at least one of the control commands based on at least one motion detected by the motion detection sensor among the plural motions; and
   a printing unit which prints based on at least the one of the control commands acquired by the control unit.

2. The printing device according to claim 1, further comprising
   a display unit, wherein
   the control unit acquires a first control command based on first motion detected by the motion detection sensor among the plural motions, and
   the display unit displays plural images based on plural pieces of print data acquired from the memory storing the plural pieces of print data sequentially based on the first control command each time the first motion is detected by the motion detection sensor.

3. The printing device according to claim 2, wherein
   the control unit acquires a second control command based on second motion detected by the motion detection sensor and different from the first motion among the plural motions after acquiring the first control command, and
   based on the second control command, the control unit acquires, as input data, at least one image among the plural images displayed on the display unit when the second motion is detected.

4. The printing device according to claim 1, further comprising
   a cutting unit, wherein
   the control unit acquires a third control command based on third motion detected by the motion detection sensor among the plural motions, and
   the cutting unit cuts based on the third control command when the third motion is detected by the motion detection sensor.

5. A printing device, comprising:
   a motion detection sensor which detects plural motions of the printing device to move in a three-dimensional space;
   a control unit which acquires, as input data, from a memory storing combinations of plural motions among the plural motions detectable by the motion detection sensor and plural character types in association with each other, a character type associated with a combination of the motions detected by the motion detection sensor; and a printing unit which prints based on the input data acquired by the control unit.

6. The printing device according to claim 5, further comprising a display unit, wherein the display unit displays the motions detected by the motion detection sensor or the character type associated with the combination of the motions, and the control unit acquires, as the input data, the character type displayed on the display unit.

7. The printing device according to claim 6, wherein an arrangement of the plural character types is stored in the memory, when the motion detection sensor detects the first motion among the plural motions, the display unit displays at least one character sequentially in ascending order of the arrangement of character types every predetermined time based on the first motion, and when the motion detection sensor detects the second motion among the plural motions, the display unit displays at least one character sequentially in descending order of the arrangement of character types every predetermined time based on the second motion.

8. The printing device according to claim 7, wherein the first motion and the second motion are tilts in right and left directions of the printing device, respectively.

9. The printing device according to claim 5, wherein the plural character types mean that one character type is composed of plural characters, plural character types, each composed of the plural characters, are stored in the memory, and the combination of plural motions is a combination of third motion to select a first character that constitutes part of the character type, and fourth motion different from the third motion to select a second character from among plural characters corresponding to the first character.

10. The printing device according to claim 9, wherein the first character is a consonant and the second character is a vowel.

11. The printing device according to claim 9, wherein the third motion is motion of the printing device to move in a first direction, and the fourth motion is motion of the printing device to move in a second direction different from the first direction after the printing device moves in the first direction.

12. A printing device, comprising:

a motion detection sensor which detects plural motions of the printing device to move in a three-dimensional space;

a control unit which accepts input of print data and acquires layout information according to a trajectory of the printing device based on the motions detected by the motion detection sensor, the layout information are related to a layout of an image corresponding to the print data input to the control unit; and a printing unit which prints based on the layout information acquired by the control unit.

13. The printing device according to claim 12, wherein the print data are a character string containing plural characters.

14. The printing device according to claim 12, wherein the layout information contains information on a line connecting at least two points including a starting point and an ending point of motion of the printing device.

15. The printing device according to claim 14, wherein the layout information contains direction information at the starting point and the ending point of the printing device.

16. The printing device according to claim 12, wherein when the motion detection sensor detects first motion of the printing device, the control unit changes a size of the print data from the starting point of the print data to the ending point of the print data according to a trajectory of the printing device based on the first motion.

17. The printing device according to claim 16, wherein a maximum size or a minimum size of the print data is changed according to a speed of the first motion detected by the motion detection sensor.

18. The printing device according to claim 12, wherein

The control unit which determines that start motion or end motion is detected when predetermined motion is detected by the motion detection sensor, the control unit acquires the layout information during a period after the start motion is detected and before the end motion is detected.

* * * * *